United States Patent
Uekawa et al.

[19]

[11] Patent Number: 5,845,228
[45] Date of Patent: Dec. 1, 1998

[54] VEHICLE-ROUTE COMPUTING APPARATUS

[75] Inventors: Akio Uekawa; Ichiro Nakahori, both of Tokyo, Japan

[73] Assignee: Mitsubishi Denki Kabushiki Kaisha, Tokyo, Japan

[21] Appl. No.: 718,044

[22] Filed: Sep. 16, 1996

[30]  Foreign Application Priority Data

Feb. 8, 1996  [JP]  Japan .................................... 8-022682

[51] Int. Cl.⁶ ............................ G05D 1/00; G06F 165/00
[52] U.S. Cl. ........................ 701/209; 701/201; 701/202; 340/990; 340/995
[58] Field of Search .................................... 701/201, 202, 701/204, 208, 209, 210, 211, 212, 216, 217; 340/988, 990, 995

[56]  References Cited

U.S. PATENT DOCUMENTS

| | | | |
|---|---|---|---|
| 4,984,168 | 1/1991 | Neukrichner et al. ................... | 701/210 |
| 5,168,452 | 12/1992 | Yamada et al. .......................... | 701/202 |
| 5,220,507 | 6/1993 | Kirson ...................................... | 701/202 |
| 5,369,588 | 11/1994 | Hayami et al. .......................... | 701/209 |
| 5,428,545 | 6/1995 | Maegawa et al. ....................... | 701/210 |
| 5,475,598 | 12/1995 | Fushimi et al. ......................... | 340/990 |
| 5,486,822 | 1/1996 | Tenmoku et al. ....................... | 340/995 |
| 5,502,640 | 3/1996 | Yagyu et al. ............................ | 701/200 |
| 5,513,110 | 4/1996 | Fujita et al. ............................. | 701/207 |
| 5,557,522 | 9/1996 | Nakayama et al. ..................... | 701/200 |

FOREIGN PATENT DOCUMENTS 5-53501  3/1993  Japan .

OTHER PUBLICATIONS

"A Route Search Method Based on Non–Uniformly Divided Rectangles of Road Networks", by Kato et al, article I–387 and 388 on 50th Annual Meeting of Information Processing Society of Japan, 1995 (month is not available).

"A Route Search Method Using Search Areas Restricted Through Knowledge" by Kato et al, article I–389 and 390 on 50th Annual Meeting of Information Processing Society of Japan, 1995 (month is not available).

*Primary Examiner*—Tan Q. Nguyen
*Attorney, Agent, or Firm*—Sughrue, Mion, Zinn, Macpeak & Seas, PLLC

[57]  ABSTRACT

Routes from a departure area to a plurality of destination areas are found as a departure-area route network data set and a plurality of such departure-area route network data sets computed for all departure areas are then stored in advance in a road-map storing memory unit 4 and a departure-area route network data storing memory unit 5. At a route-search time, a departure-area determining unit 3 determines the departure area of the vehicle to which a departure position pertains and a route-search processing means 7 uses a departure-area route network data set for the departure area determined by the departure-area determining unit 3 as well as road maps of the departure area and the vicinity of a departure position to search for guidance routes from the departure position to the destination position in a short time, presenting the guidance routes to the driver.

19 Claims, 25 Drawing Sheets

⊘ : DEPAR-
    TURE
    POSITION

▨ : DEPAR-
    TURE
    AREA

FIG. 13

|  |  | DEPARTURE AREA 1 | DEPARTURE AREA 2 | ... | DEPARTURE AREA M |
|---|---|---|---|---|---|
| LINK 1 | UPSTREAM DIRECTION | 1 | 1 |  | 1 |
|  | DOWNSTREAM DIRECTION | 1 | 0 |  | 0 |
| LINK 2 | UPSTREAM DIRECTION | 1 | 1 |  | 0 |
|  | DOWNSTREAM DIRECTION | 0 | 0 |  | 0 |
| LINK 3 | UPSTREAM DIRECTION | 0 | 0 |  | 1 |
|  | DOWNSTREAM DIRECTION | 0 | 1 | ... | 1 |
| ... |  |  |  |  |  |
| LINK N | UPSTREAM DIRECTION | 1 | 1 |  | 0 |
|  | DOWNSTREAM DIRECTION | 0 | 0 |  | 1 |

1 : USED    0 : NOT USED

FIG. 14

| START NODE | END NODE | DEPARTURE AREA 1 | DEPARTURE AREA 2 | ... | DEPARTURE AREA M |
|---|---|---|---|---|---|
| 1 | 2 | 0 | 1 | | 0 |
| 1 | 3 | 1 | 0 | | 1 |
| 1 | 5 | 0 | 1 | | 0 |
| 2 | 1 | 1 | 0 | | 1 |
| 2 | 6 | 0 | 1 | | 1 |
| 2 | 8 | 1 | 1 | | 1 |
| ..... | ..... | ..... | ..... | | ..... |

1 : USED   0 : NOT USED

- - - - - : ROADS OF LEVEL 0
———— : ROADS OF LEVEL 1
——→ : DEPARTURE-
AREA BOUNDARY
LINKS OF LEVEL 2

FIG. 26

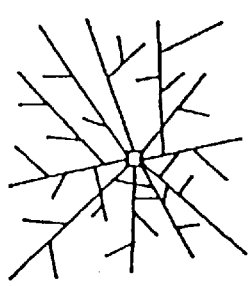
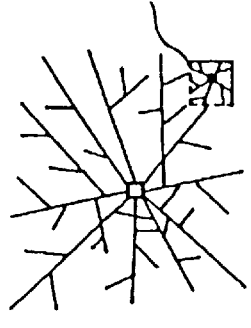
DESTINATION-AREA ROUTE NETWORK FOR SMALL DESTINATION AREA
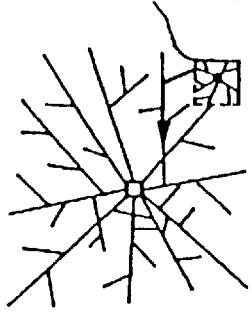
DESTINATION-AREA ROUTE NETWORK FOR SMALL DESTINATION AREA

ST22 — SET A DEPARTURE POSITION

ST23 — LOAD THE ROAD MAP OF THE VICINITY OF THE DEPARTURE POSITION AND ITS DEPARTURE-AREA ROUTE NETWORK

ST24 — SET A DESTINATION POSITION

ST25 — LOAD THE ROAD MAP OF THE VICINITY OF THE DESTINATION POSITION AND ITS DESTINATION-AREA ROUTE NETWORK FOR THE SMALL DESTINATION AREA

ST26 — START FINDING ROUTES

ST27 — SEARCH FOR OPTIMUM ROUTES IN AN OPPOSITE DIRECTION FROM THE DESTINATION POSITION TO THE DEPARTURE POSITION

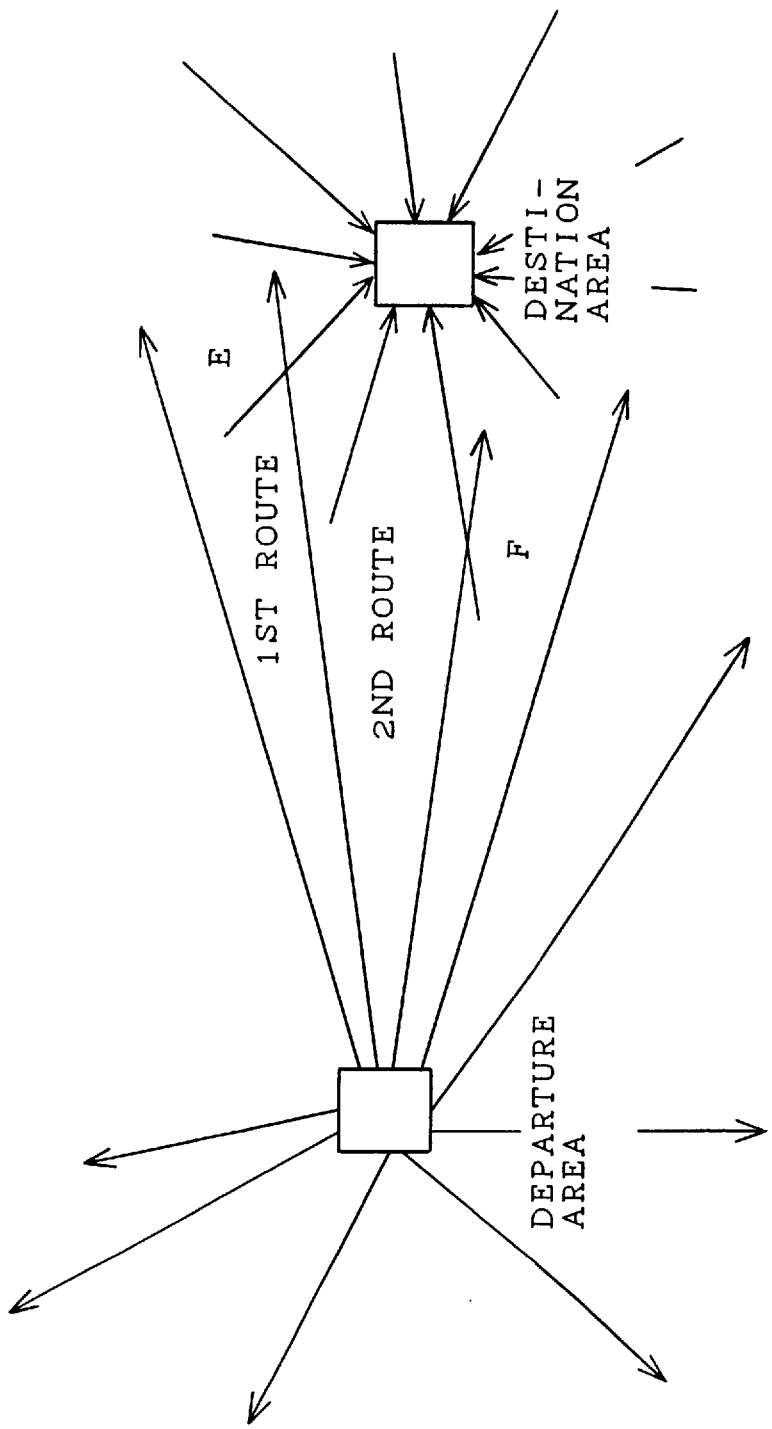

VEHICLE-ROUTE COMPUTING APPARATUS

BACKGROUND OF THE INVENTION

1. Field of the Invention

The present invention relates to a vehicle-route computing apparatus mounted on a vehicle for providing the driver with an optimum route to reach a destination position which is also referred to hereafter as a target position. In particular, the present invention relates to a vehicle-route computing apparatus for computing at a high speed an optimum route from a departure position or the present position of a vehicle driven by the driver to a target position and providing the driver with computation results as recommended roads in response to the driver's setting of the target position.

2. Description of the Prior Art

Dijkstra's method is known as a conventional technique for computing an optimum route from a departure position to a target position. Dijkstra's method can calculate a cost minimum route between two points in a road network.

According to Dijkstra's method, a recommended route, for example a travel time minimum route, is found among a plurality of routes which are obtained by connecting two positions on a road map. The road map is searched exhaustively for possible routes connecting the two positions and then a cost minimum route is computed. Dijkstra's method has a shortcoming that it takes an extremely long time to search the road map.

A conventional technique for computing an optimum route has been proposed as a method for speeding up the process of searching the road map for desired routes. According to this technique, computation for a plurality of routes is executed off-line before a vehicle navigation system is mounted on board and computation results are stored in an external storage device such as a CD-ROM in advance. When the navigation system is used for on-line execution of a route searching process after being mounted on a vehicle, data stored in the external storage device is searched for desired information and the desired information is then read out from the external storage device for use in route calculation. Such conventional techniques are described in documents such as:

(1) "A Route Search Method based on Non-uniformly Divided Rectangles of Road Networks" presented by Masami Kato et al. to the 50th annual meeting of Information Processing Society of Japan held in the 1st half of the year of 1995, in Japan (I-387 and 388).

(2) "A Route Search Method using Search Areas Restricted through Knowledge" presented by Masami Kato et al. to the 50th annual meeting of Information Processing Society of Japan held in the 1st half of the year of 1995, in Japan (I-389 and 390).

The methods of searching for an optimum route described in references (1) and (2) adopt the following techniques of searching for an optimum route.

First of all, according to both the methods of searching for an optimum route described in references (1) and (2), a road map is searched for optimum routes from an area including a departure position to an area including a target position off-line and results of the search are then stored in a memory unit or the like in advance.

Then, according to the method of searching for an optimum route described in reference (1), regions to be searched between a departure position and a target position are limited and results are also stored in the memory unit in advance. Then, when the on-line operation is executed, a road network for the limited region is read out and, later on, searched for an optimum route by means of Dijkstra's method.

According to the method of searching for an optimum route described in reference (2), on the other hand, routes to be searched between a departure position and a target position which routes have been calculated in advance are also stored in the memory unit in advance as a network of routes to be searched. Then, when the on-line operation is executed, the network of routes to be searched is searched for an optimum route by means of Dijkstra's method.

In addition, according to a technique disclosed in documents such as JP-A 5-53501 with the title "A Method for Determining an Optimum Route by Using a Route Table," initial paths from a departure position to a plurality of target positions are computed off-line and results of the calculation are stored in a memory unit as a route table in advance. When an apparatus for computing vehicle routes is used for on-line execution of a route searching process, initial routes are read out from the route table for each position and an optimum route is calculated by reading initial routes repeatedly while changing the position from one to another.

The conventional vehicle-route computing apparatus adopts the methods of searching for an optimum route described above. For example, in the method of searching for an optimum route whereby the area of the region to be searched is narrowed, a region or a road network to be searched has to be stored for each combination of departure-position and target-position areas. Let, for example, the number of areas be 100. In this case, there are 100×99=9,900 different combinations, giving rise to a problem that the required storage capacity of the external storage device increases due to the large number of area combinations.

In addition, in the case of the conventional technique wherein path tables are prepared in advance and read out one after another sequentially as the vehicle moves forward, a path table needs to be stored in an external storage device such as a CD-ROM for each position, giving rise to a problem similar to that of the other method described above that the required storage capacity of the external storage device increases due to a large number of area combinations.

Further, while the vehicle is running, it is necessary to read out data from an external storage device typically for each point of intersection. As a result, the number of accesses to the external storage devices increases, giving rise to a shortcoming that the search time becomes inevitably longer.

In addition, in order to shorten the search time, data of all optimum routes is stored in a main storage device such as a RAM unit. In this case, none the less, the required storage capacity of the main storage device increases substantially and, as a result, gives rise to a problem that the manufacturing cost of the vehicle-route computing apparatus becomes higher.

SUMMARY OF THE INVENTION

The present invention is implemented to solve the problems of the conventional vehicle-route computing apparatus. It is thus an object of the present invention to provide a vehicle-route computing apparatus which is capable of executing the computation of an optimum recommended route at a high speed even if the onboard memory has only a small storage capacity.

In a vehicle-route computing apparatus according to a preferred mode provided by the present invention, routes from a departure area to a plurality of destination areas are calculated beforehand as a departure-area route network data. A plurality of departure-area route network data calculated corresponding to departure-areas respectively is set in a departure-area route network storage device. The departure-area route network data for a departure position of the vehicle at a drive time is read out from the departure-area route network storage device by route-search processing means. The route-search processing means searches a guidance route from the departure position to the target position recommended to the driver and provides the driver with the guidance route.

In a vehicle-route computing apparatus according to another preferred mode provided by the present invention, routes from a plurality of destination areas to a departure area are calculated beforehand as a destination-area route network data. A plurality of destination-area route network data calculated corresponding to destination-areas respectively is set in a destination-area route network storage device. The destination-area route network data for a destination position of the vehicle at a drive time is read out from the destination-area route network storage device by route-search processing means. The route-search processing means searches a guidance route from the departure position to the target position recommended to the driver and provides the driver with the searching result.

In a vehicle-route computing apparatus according to a still further preferred mode provided by the present invention, a plurality of departure-area route network data is stored in a departure-area route network storage device and a plurality of destination-area route network data is stored in a destination-area route network storage device. The departure-area route network data and the destination-area route network data are read out from the departure-area route network storage device and the destination-area route network storage device at a drive time by a route-search processing means. The route-search processing means searches both the departure-area route network data and destination-area route network data for a guidance route from the departure position to the target position to be recommended to the driver and provides the driver with the guidance route resulting.

BRIEF DESCRIPTION OF THE DRAWINGS

FIG. 13 is an explanatory view showing a technique to create a departure-area route network adopted by the 1st embodiment according to the present embodiment;

FIG. 14 is an explanatory view showing a technique to create a departure-area route network adopted by the 1st embodiment according to the present embodiment;

FIG. 26 is an explanatory view showing the operation of a route-search processing unit as implemented by the 4th embodiment according to the present embodiment;

FIG. 30 is an explanatory view showing the operation of a vehicle-route computing apparatus as implemented by the 5th embodiment according to the present embodiment.

DETAILED DESCRIPTION OF THE PREFERRED EMBODIMENTS

The present invention will become apparent from the following detailed description of preferred embodiments with reference to the accompanying diagrams.

Embodiment 1

Figure 1:
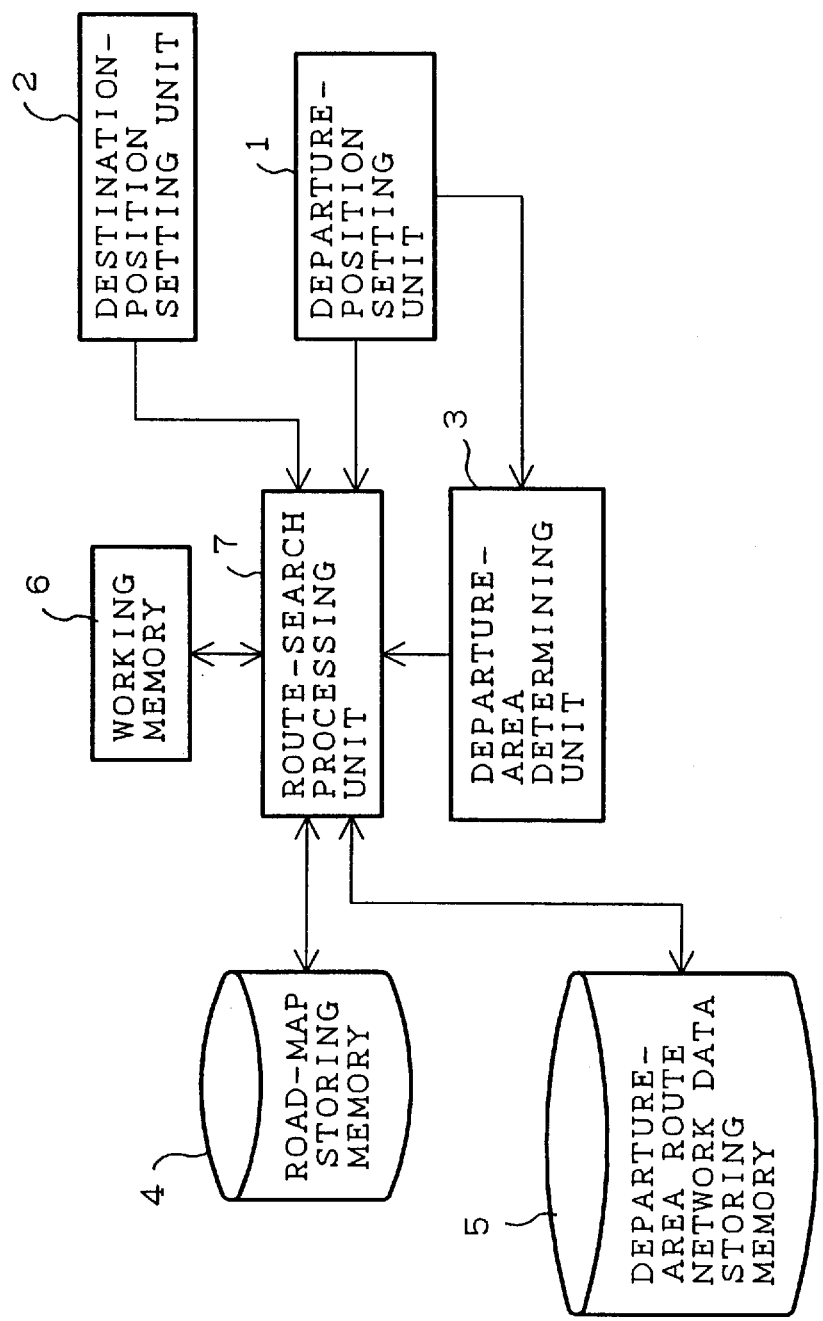
FIG. 1 is a diagram showing the configuration of a vehicle-route computing apparatus as implemented by a 1st embodiment according to the present invention.

FIG. 1 is a diagram showing the configuration of a vehicle-route computing apparatus as implemented by a 1st embodiment provided by the present invention. Reference numeral 1 shown in the figure denotes a departure-position setting unit and reference numeral 2 is a destination-position setting unit for setting a destination position. Reference numeral 3 is a departure-area determining unit serving as a departure-area determining means for determining a departure area, an area where the present position is. Reference numeral 4 is a road-map storing memory unit serving as a road-map storage means for storing road maps for guiding the vehicle. Reference numeral 5 is a departure-area route network data storing memory unit serving as a departure-area route network storage means for storing departure-area route network data (that is, data of a departure-area route network comprising routes from one departure area to a plurality of destination areas) for each departure area. Reference numeral 6 is a working memory area for temporarily storing data for route computation which data is loaded from the road-map storing memory unit 4 and the departure-area route network data storing memory unit 5. Reference numeral 7 is a route-search processing unit serving as a route-search processing means for searching for an optimum route to a destination position.

Next, the configuration of components constituting the 1st embodiment implementing the vehicle-route computing apparatus and their operations are explained.

The departure-position setting unit 1 shown in the figure identifies the present position of the vehicle and sets the position as a departure position in route computation by using a vehicle-speed pulse signal and signals generated by a variety of sensors as well as the road map stored in the road-map storing memory unit 4 as a base. The sensors include a gyroscopic sensor and a GPS (Global Positioning System) used for inferring the present position of a vehicle by using a radio wave transmitted by an artificial satellite. The present position of a vehicle is determined by means of a locator function for identifying nodes (road branch points and road turning points) or a link (road segment between branch points) in close proximity to the present position of the vehicle.

The destination-position setting unit 2 shown in the figure determines a node or a link in close proximity to a destination position set by the user (that is, the driver) as a destination position used in the road computation. The user specifies the destination position by moving a cursor on a road map displayed on the screen of a display unit such as a CRT or a LCD (Liquid Crystal Display) of a vehicle navigator, or by means of a search function for identifying a destination position from information such as a geographical name, the name of a facility existing in the destination area or a telephone number.

The departure-area determining unit 3 shown in the figure determines an area in which the departure position set by the departure-position setting unit 1 exists and notifies the departure-area route network data storing memory unit 5 of the area. Areas are obtained by dividing a country as a whole into rectangular regions as shown in FIG. 2 or dividing a country into administrative zones such as provinces or states which each have a multi-side region as shown in FIG. 3.

Figure 2:
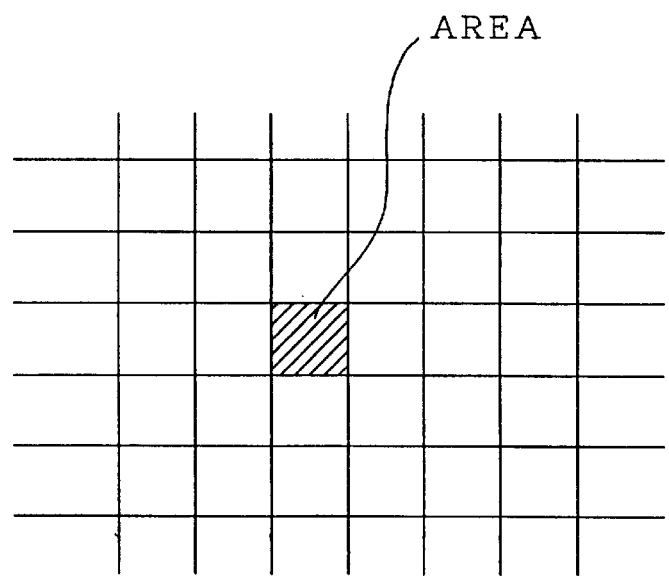
FIG. 2 is an explanatory view used for explaining a typical configuration of areas adopted in the 1st embodiment according to the present invention.
Figure 3:
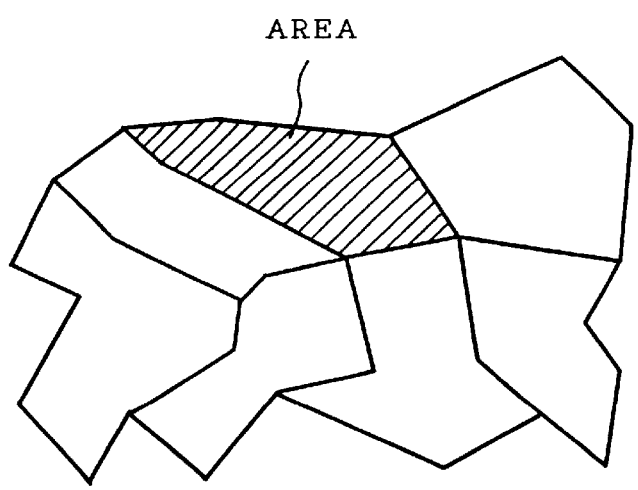
FIG. 3 is an explanatory view used for explaining another typical configuration of areas adopted in the 1st embodiment according to the present invention.

In the case of areas obtained by dividing a country into rectangular regions as shown in FIG. 2, a departure area can be determined with ease from the coordinates of a departure position.

The road-map storing memory unit 4 shown in the figure is a storage medium with a large storage capacity such as a CD-ROM, an IC memory card and a magnetic disk used for storing a plurality of road-map data sets which include information on connection and relation between nodes and links of roads and attribute data thereof. The information is controlled in rectangular-area units called meshes, the rectangular regions shown in FIG. 2. To be more specific, the road-map storing memory unit 4 is used for storing information for each mesh.

For example, the mesh unit has a size of 10 km×10 km. A node is used for identifying a turning point and a branch point of a road such as an intersection. Node data includes the number of a node, the number of an adjacent node linked to the node, the number of a link connected to the node and the type of the node.

A link is a road segment between two adjacent branch points. Data of a link includes the number of a link, a start node, an end node, the length of the link, the type of the road, the width of the road, information on the usage of the link in directions toward the nodes, information on traveling related regulations such as one-way direction, the required travel time and interpolation points forming the link.

It should be noted that road-map data is stored in the road-map storing memory 4 at different hierarchical levels in accordance with the details of the roads. The road map at the most detailed lowest hierarchical level used in the route computation is referred to hereafter as a road map of level 0 (or a level-zero road map) whereas a road map at a high hierarchical level comprising only main trunk roads to remote destinations is referred to hereafter as a road map of level 1 (or a level-one road map). A road map at a high hierarchical level has a small amount of data per unit area in comparison with a road map at a low hierarchical level. For this reason, in order to make the amount of data per mesh all but uniform, the area of a mesh is set so that, the higher the degree of the hierarchical level, the larger the area of the mesh. For example, with the size of mesh of level 0 set at 10 km×10 km, the size of mesh of level 1 set at 80 km×80 km.

The reason why road-map data is stored at different hierarchical levels is that, in the first place, it is difficult to load a detailed road map of the whole country into a working memory area at the same time due to a storage-capacity constraint. In the second place, it is necessary to reduce the number of roads to be searched in search for optimum routes to a remote destination.

A road map at a high hierarchical level can be created by selecting trunk roads having important link attributes such as the road type and the road width. As an alternative, a road map at a high hierarchical level can also be created by identifying a main route required to go from a departure area to a destination area as an inter-area main route and repeating the identification of such an inter-area main route for each combination of departure and destination areas. The road map at a high hierarchical level is obtained by using the principle of superposition as a logical sum of all identified inter-area main routes.

It should be noted that in the identification of inter-area main routes between departure and destination areas, first of all, a route is identified by regarding an area boundary link of a departure area as a departure position and regarding an area boundary link of a destination area as a destination position. An area boundary link of a departure area is a link located on the boundary of the departure area. Likewise, an area boundary link of a destination area is a link located on the boundary of the destination area. The identification of such a route is repeated for each combination of departure and destination positions. Route portions separated away from area boundary points of areas regarded as the departure and destination positions by a predetermined distance or a distance longer than the predetermined one are taken as main routes. The routes tend to be united as the distances from area boundary increase. Accordingly, such route portions can be regarded as main roads between departure and destination areas.

It should be noted that, in the process of taking such route portions as main routes, routes are found for all area boundary links because of the following reason. Since a route from a departure position in a departure area to a destination position in a destination area always passes through an area boundary link, all routes from an area boundary link of a departure area to an area boundary link of a destination area are identified because all routes from any arbitrary positions in a departure area to any arbitrary positions in a destination area all coincide with routes between area boundary links in regions outside the departure and destination areas.

Figure 4:
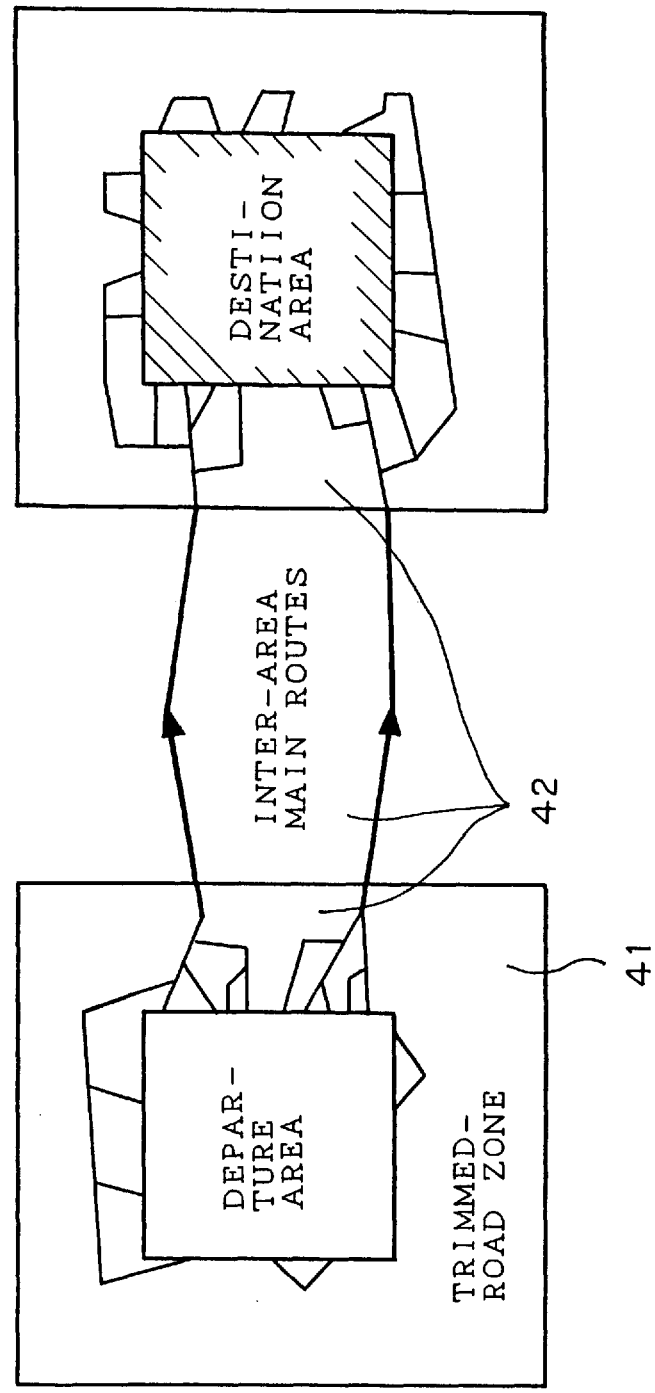
FIG. 4 is an explanatory view showing a technique to fetch main routes between areas in a road-map data adopted by the 1st embodiment according to the present embodiment.

FIG. 4 shows a method of creating a road map of level 1 between areas. First of all, routes from all area boundary links of a departure area on a road map of level 0 to all area boundary links of a destination area are found out. Then, a trimmed-road zone 41, that is, a zone with routes thereof trimmed, is provided around the departure area. Similarly, a trimmed-road zone 41 is provided around the destination area. In this way, roads in close proximity to the departure and destination areas are removed. Road portions outside the trimmed-road zones 41 are found as inter-area main routes 42. As described earlier, since the farther a position in close proximity to an area boundary from the area boundary, the smaller the number of road portions at the position, it is possible to find main routes from the road portions. Let an area be equal in size to 1 mesh. In this case, a donut-like region having a size equal to 8 meshes surrounding this area is regarded as a trimmed-road zone.

Figure 5:
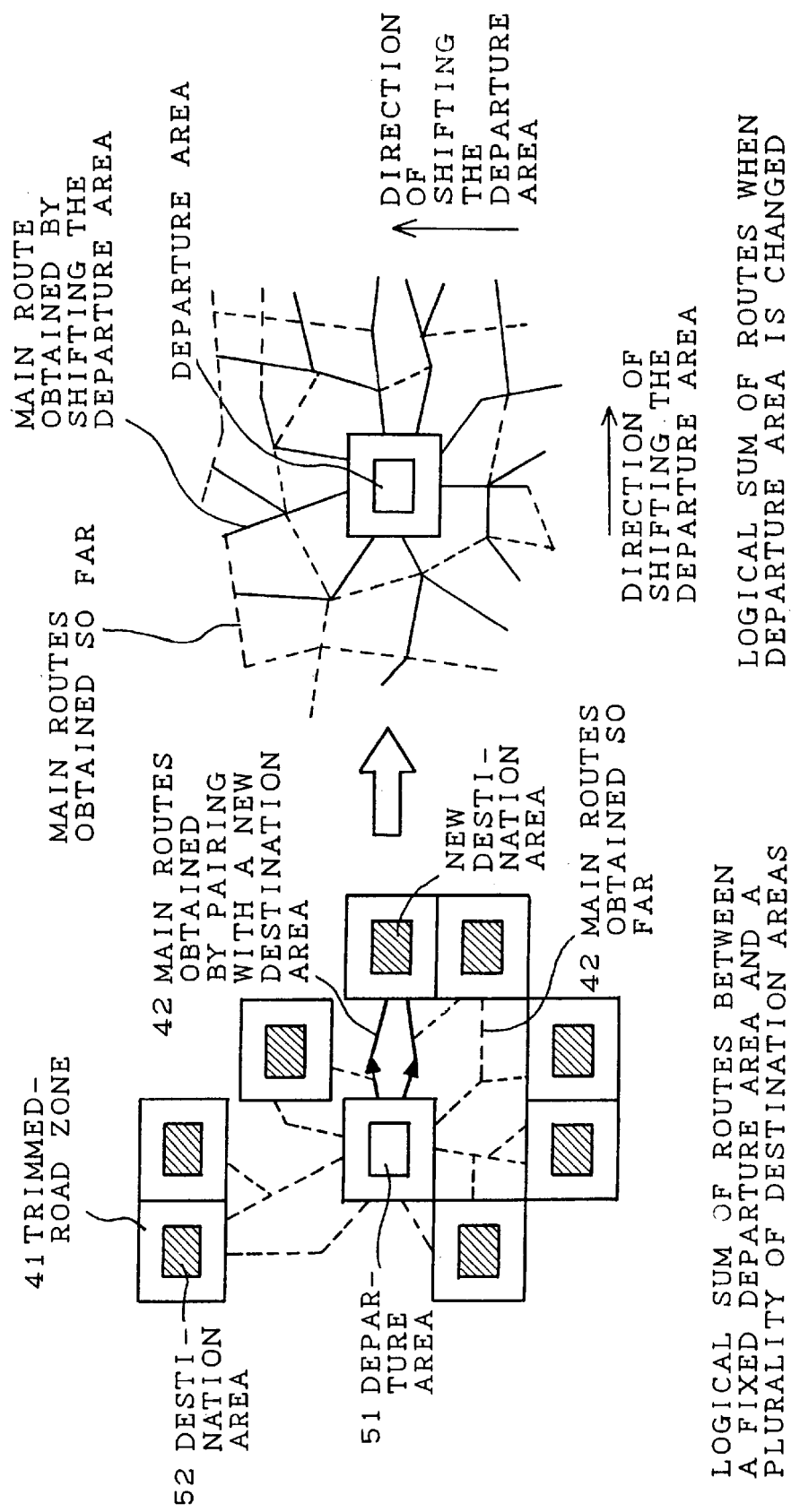
FIG. 5 is an explanatory view showing a technique to create a road map of a high hierarchical level adopted by the 1st embodiment according to the present embodiment.

First of all, as shown in FIG. 5 inter-area main routes from a fixed departure area 51 are found in the way described above repeatedly for destination areas 52 at different locations and a logical sum of inter-area main routes from the fixed departure area 51 to the different destination areas 52 is computed by using the principle of superposition. Then, a logical sum of inter-area main routes is calculated by the principle of superposition similarly for each departure area 51 by changing the departure area 51. Finally, a logical sum of logical sums obtained by changing the departure area 51 is calculated by the principle of superposition to create a road map of level 1.

A road map of level 2 is created from a road map of level 1 in the same way as a road map of level 1 is created from a road map of level 0.

By using the same processing, a road map at a higher hierarchical levels can be created.

It takes much calculation time to create a road map at a high hierarchical level by searching for optimum routes as described above. However, road maps at high hierarchical levels can be once created by using an EWS (Engineering Work Station) and stored in a storage device in advance. When the driver requests the vehicle-route computing apparatus to find an optimum route from a departure position to a destination position after the onboard navigation apparatus is mounted on the vehicle, it is not necessary to repeat the execution of the processing to create the road maps.

In addition, in comparison with a road map at a high hierarchical level created only from road attributes such as road types and road widths, in a road map at a hierarchical level created in the way described above, results of searching road maps at lower hierarchical levels for optimum routes are reflected, allowing absolutely necessary roads to be selected from the high hierarchical level with the real-life point of view taken into consideration even if such roads have a low degree of importance when viewed from the administration's (or the government's) standpoint. As a result, it is easy for the driver to select a very useful route. Further, since minimum necessary roads are selected in the computation of an inter-area route, no redundant roads are picked up so that the number of roads in the road map can be reduced.

As described above, the departure-area route network data storing memory unit 5 shown in FIG. 1 is used for storing departure-area route network data (that is, data of a departure-area route network comprising routes from one departure area to a plurality of destination areas) for each departure area. To put it in more detail, a departure-area route network is created by computing recommended routes from one departure area to all destination areas off-line by means of a computer such as an EWS and storing the computation results in a storage device.

The calculation of route data of a departure-area route network is explained by referring to FIGS. 6 to 10 as follows.

Figure 6:
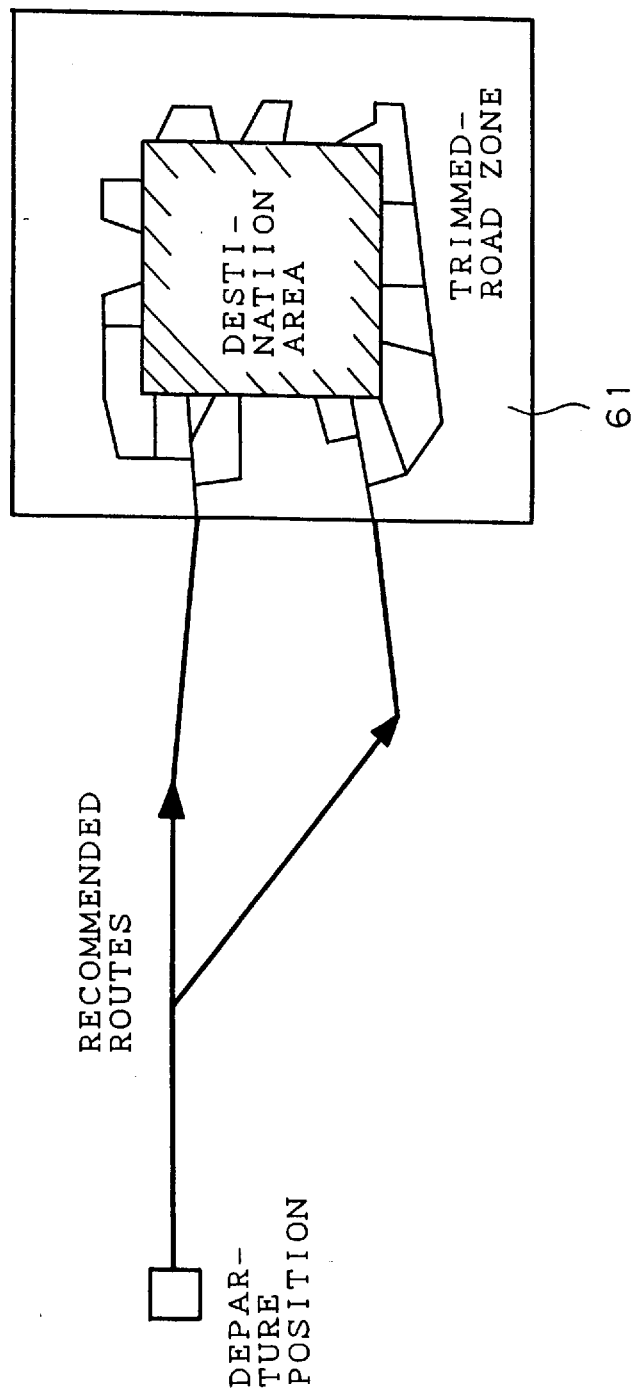
FIG. 6 is an explanatory view showing a technique to create a departure-area route network adopted by the 1st embodiment according to the present embodiment.
Figure 7:
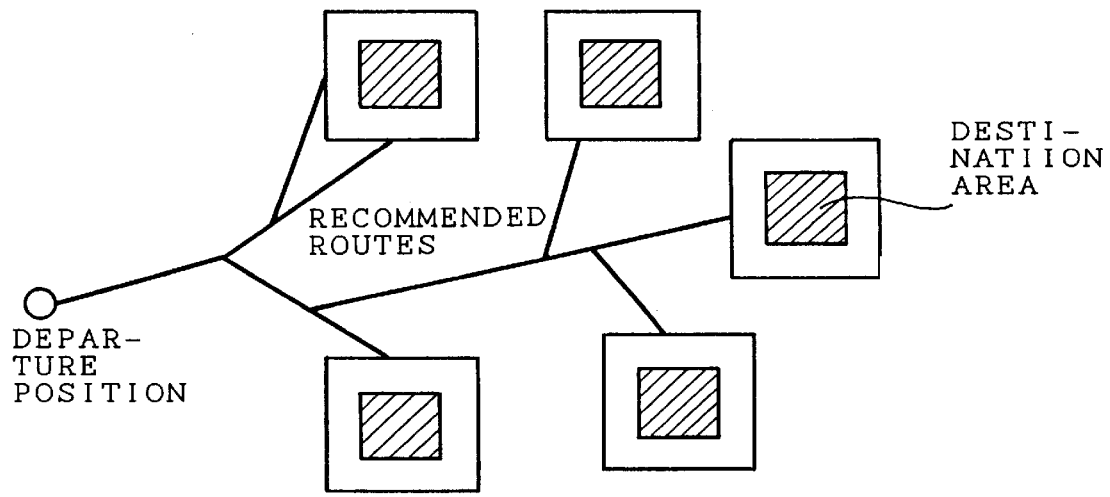
FIG. 7 is an explanatory view showing a technique to create a departure-area route network adopted by the 1st embodiment according to the present embodiment.

FIG. 6 is an explanatory view showing recommended routes from a departure position to a destination area. As shown in the figure, a trimmed-road zone 61 similar to the trimmed-road zone 41 described earlier is provided, surrounding the destination area. In the trimmed-road zone 61, small roads in close proximity to the destination area are eliminated, leaving only main roads. In this way, recommended routes from the departure position to the destination area can be found. Recommended routes from a departure position to a destination area are found by changing the destination area from one location to another and a logical sum of recommended routes obtained by sequentially changing the destination area is computed by the principle of superposition to give recommended routes from one departure position to all destination areas shown in FIG. 7. As shown in the figure, the recommended routes from one departure position to all destination areas has a shape resembling a tree with the root thereof located at the departure position. That is to say, the recommended routes from one departure position to all destination areas are a route tree having centripetal forces directed from branches to the root of the tree.

By following road links from a branch of the tree on the destination-area side sequentially one after another, an optimum route from the departure position to the destination position can be obtained.

Figure 8:
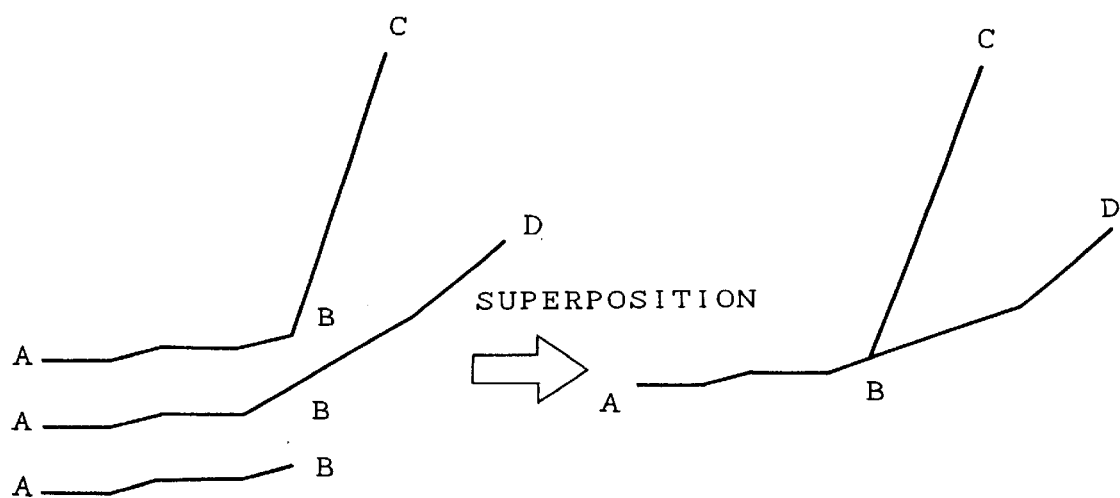
FIG. 8 is an explanatory view used for explaining Bellman's principal of optimality.

The fact that recommended routes from a position to a plurality of positions form a tree is proven by Bellman's principal of optimality as shown in FIG. 8. The above fact is proven as follows. If there is one route from a position A to another position and the shortest route from the position A to a position C passes through a position B, the route between the positions A and B of the shortest route from the position A to the position C coincides with the shortest route from the position A to the position B.

Similarly, if the shortest route from the position A to a position D passes through a position B, the route between the positions A and B of the shortest route from the position A to the position D coincides with the shortest route from the position A to the position B. Thus, superimposing recommended routes from a position, the position A in this example, to a plurality of positions, the positions B, C and D in this example, results in a tree-like shape. This property holds true without regard to the direction of the search for an optimum route.

It should be noted that recommended routes form a perfect tree-like shape only if the shortest route between two positions can be expressed by a single line. The purpose of providing a trimmed-road zone for a destination area is to reduce the number of routes between a departure area and a destination area so as to set a high degree of tree resemblance, that is, a high rate of tree-structure portion.

In order to set a high degree of tree resemblance, a region enclosing a destination position is established within a predetermined distance from the destination position as a trimmed-road zone and all links in the trimmed-road zone are all cut out. As an alternative, the number of links to be cut out from the road-trimmed zone can be limited.

In addition, instead of establishing a road-trimmed zone, links on the destination-area side are cut out, leaving only a predetermined number of links.

As another alternative, instead of finding routes to all destination-area boundary links in search for a recommended route from a departure position to a destination area, a representative destination position is determined for the destination area and routes from the departure position to the representative destination position are then identified. In this way, the number of routes can be reduced, allowing the degree of tree resemblance to be increased without providing a trimmed-road zone.

Figure 9:
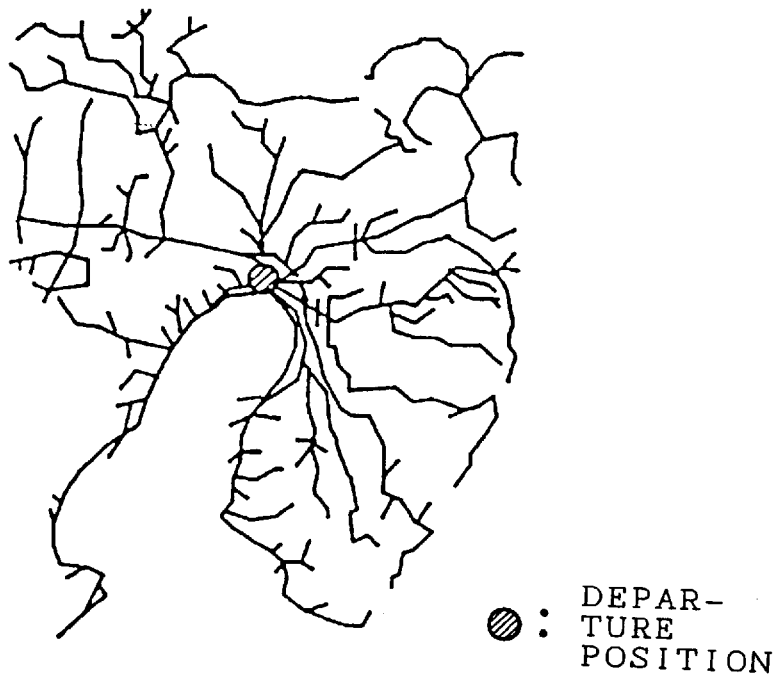
FIG. 9 is an explanatory view showing a technique to create a departure-area route network adopted by the 1st embodiment according to the present embodiment.

FIG. 9 shows an example of recommended routes having a tree-like shape which are created from a certain road in the city of Amagasaki in Kinki area of Japan which serves as a departure position to all destination areas. From these tree-shaped recommended routes, a recommended route from a departure position to a destination position can picked up or selected by following branches of the tree one after another from the destination area to the root of the tree.

Recommended routes from a departure position to all destination areas are computed off-line by means of an EWS or the like and results of the computation are then stored in an external storage memory device in advance. In this way, the driver can find a recommended route by using an onboard navigation apparatus and display the optimum route to a destination area on a vehicle-route computing apparatus while driving the vehicle whereby the recommended optimum route is found by merely following branches of a tree toward the root thereof without the necessity for searching a road map every time.

However, since the departure position varies depending upon the vehicle on which the vehicle navigation apparatus is mounted, storing only recommended routes from a departure position in memory is not sufficient. On the other hand, in order to store recommended routes from all departure positions, a memory unit with a huge storage capacity is required. In order to solve this problem, let routes from two departure positions close to each other such as Amagasaki and Itami areas to a remote destination position such as Tokyo be taken as an example. Even though roads in the vicinity of one of the two departure positions are different from those of the other, the route to Tokyo starting with, say, Meishin Expressway is the same. Further, Tomei Express-way is chosen even if the departure positions are different since in this case Tomei Expressway is an optimum road locating forward the Meishin Expressway. Thus, most of the routes from one of the departure positions coincide with those of the other.

Here, a recommended route for all area boundary links of a departure area is found and such recommended routes are found for all destination areas. By the principle of superposition, a logical sum of the recommended routes is computed to give a departure-area route network which shows recommended routes from the departure area to all destination areas. The departure-area route network is stored in an external storage device.

Figure 10:
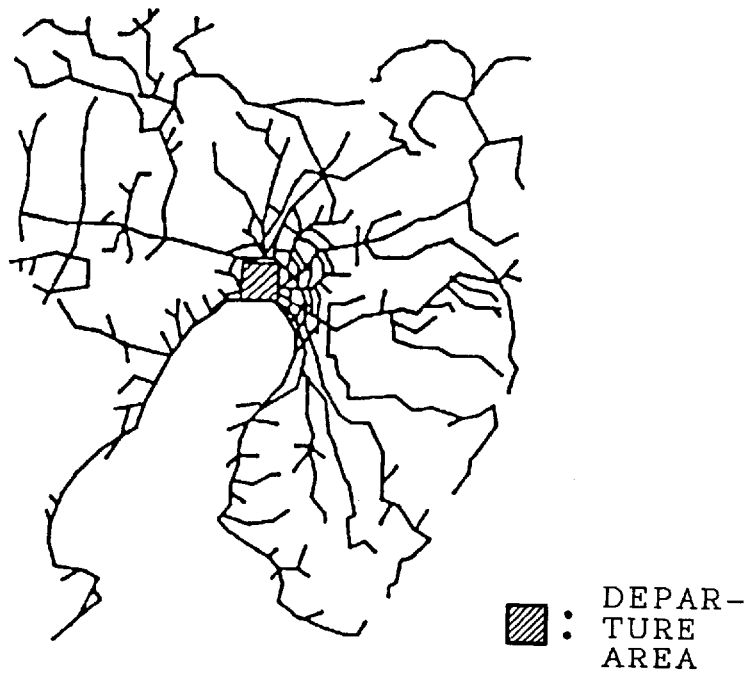
FIG. 10 is an explanatory view showing a technique to create a departure-area route network adopted by the 1st embodiment according to the present embodiment.

FIG. 10 shows recommended routes resulting from the computation of a logical sum of tree-shaped recommended routes by using the principle of superposition which recommended routes are created for a plurality of departure positions in the vicinity of the city of Amagasaki to all destination areas. As a property of a departure-area route network, the vicinity of a departure area has a network shape. In addition, the vicinity of a remote destination positions have a tree-like shape, because most parts of routes from vicinity departure points are common around remote destination points.

Since the recommended routes around the vicinity of a remote destination position have a tree-like shape, by following branches of the tree from the destination position to the departure position, a recommended route around the vicinity of a remote destination can be selected without the need for searching unnecessary branches. A recommended route can be found in shorter time than the time by merely searching a road map exhaustively for an optimum route.

As the tracing of branches from the destination position approaches the departure position, however, the shape of the recommended routes change to meshes of a net, making it no longer possible to find an optimum route by merely following branches of the tree. At that time, none the less, the departure-area route network of the net meshes can be searched for a recommended route.

It should be noted that, in addition to the recommended route from a departure position to a destination position, there may be a substitute route different from the recommended route and it is all but difficult to determine which one is better among the two routes. In this case, even with the remote destination area set, a different recommended route may be selected if the departure position varies even slightly. In this case, there may be a case in which recommended routes other than the vicinity of a departure area form meshes of a net. Also in this case, an optimum route can be found by searching the departure-area route network of the net meshes.

As described above, by using a departure-area route network, the amount of work to search for an optimum route can be reduced substantially, allowing the optimum route to be found in a short time even if the work to search the departure-area route network for the optimum route is required.

Figure 11:
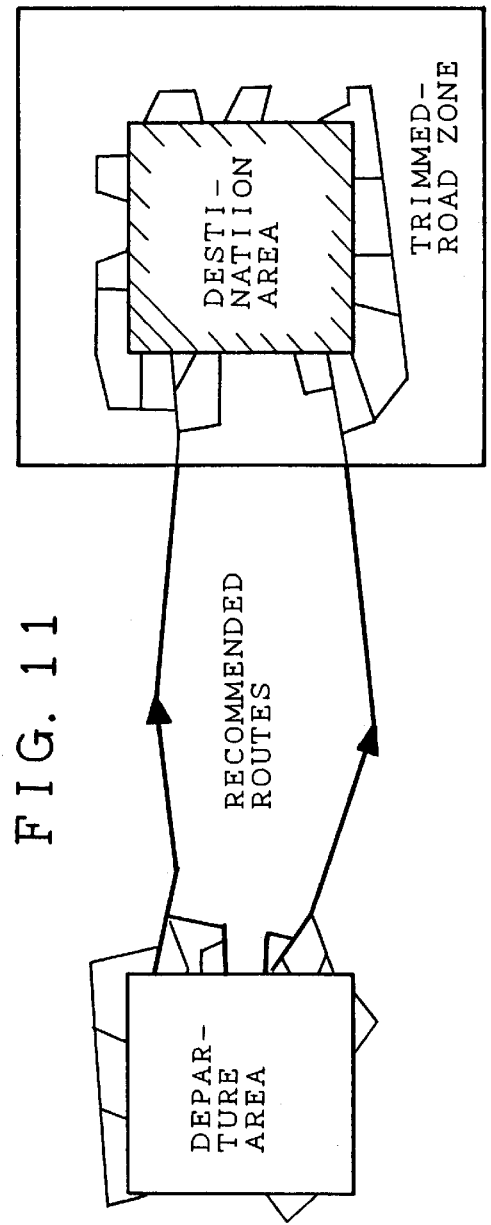
FIG. 11 is an explanatory view showing a technique to create a departure-area route network adopted by the 1st embodiment according to the present embodiment.

As described above, in the technique of creating a departure-area route network, recommended routes from a departure position in a departure area to all destination areas are first found and a logical sum of such recommended routes for all departure positions in the departure area is then computed by the principle of superposition. In addition to this technique, a departure-area route network can also be found by using another technique as shown in FIG. 11. According to this other technique, recommended routes from all boundary links of a departure area to a destination area are first found by trimming roads surrounding the destination area and a logical sum of such recommended routes obtained by varying the destination area sequentially from one to another is then computed by the principle of superposition.

Figure 12:
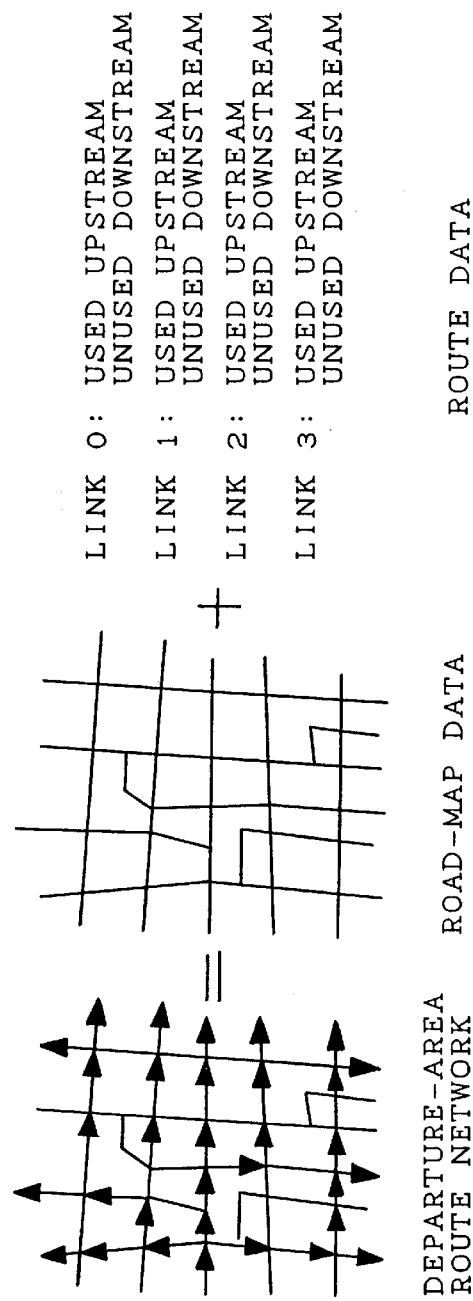
FIG. 12 is an explanatory view showing a technique to create a departure-area route network adopted by the 1st embodiment according to the present embodiment.

A departure-area route network is calculated in the ways described above for each departure area and stored in memory. In order to reduce the storage capacity of each memory unit, the departure-area route networks are divided into road-map data and route data, flag data for indicating whether or not it is possible to use road links as shown in FIG. 12. The road-map data is stored in road-map storing memory unit 4 whereas the route data is stored in the departure-area route network data storing memory unit 5.

That is to say, since a departure-area route network is created for each departure area, a huge storage capacity is required if the departure-area route networks for all departure areas are stored as a road map including link and node data for each departure area. Since links and nodes common to the departure-area route networks exist as configuration elements, however, the common links and nodes will be duplicated if information on links and nodes is stored in memory for each departure-area route network. For this reason, information on links and nodes is stored as route data separately as described above. The only information required for constructing a departure-area route network is route data indicating from which links on a road map of a departure-area route network are constructed. Therefore, part of a departure-area route network that is actually stored in the departure-area route network data storing memory unit 5 is only route data indicating whether or not it is possible to use road links stored in road-map storing memory unit 4. By dividing departure-area route networks into route data and road-map data as described above, the storage capacities of the memories can be reduced. Further, by checking the route data, necessary road links can be determined and by loading only necessary road links into the working memory area 6, the size of the working memory area 6 can also be reduced as well.

FIG. 13 shows a typical structure of route data of departure-area route networks which route data is stored in the departure-area route network data storing memory unit 5. The figure shows a table of route data of M departure-area route networks stored in the departure-area route network data storing memory unit 5. To be more specific, the table contains flags indicating whether or not it is possible to use a link in the upstream and downstream directions with respect to all the departure-area route networks. Such flags are included in the table for all links.

FIG. 14 is a view showing another typical configuration of data stored in the departure-area route network data storing memory unit 5. In this data configuration, the numbers of start and end nodes of a link are used for identifying the link.

FIG. 14 shows a table of route data of M departure-area route networks stored in the departure-area route network data storing memory unit 5. To be more specific, the table contains flags indicating whether or not it is possible to use a link in the upstream and downstream directions with respect to all the departure-area route networks. Such flags are included in the table for all links which are listed in the table in the increasing order of start-node numbers.

It should be noted that a link can be also identified by an angle formed by north direction and a line connecting the link to a node.

In addition, two numbers can be assigned to a link for upstream and downstream directions respectively and each link number is associated with a usability/un-usability flag described above.

In another structure of data stored in the departure-area route network data storing memory unit 5, flags indicating only whether or not it is possible to use a link without specifying the upstream and downstream directions or information whether it is possible or not to use nodes are stored in a table as route data for M departure-area route networks. In this case, the resulting departure-area route networks do not include information on directions normally added to links for constructing a tree, but the storage capacity of the memory for storing route data is reduced by an amount corresponding to the information, giving rise to an effect of a reduced memory size or a positive effect on conversion into a compact memory size. It should be noted that an optimum route can be found by searching an obtained departure-area route network at a speed higher than that of the search of a road map for a recommended route.

The working memory area 6 shown in FIG. 1 is typically a RAM (Random-Access Memory) which allows read and write operations to be carried out at high speeds. The departure-area route network of a departure area determined by the departure-area determining unit 3, a road map of the vicinity of a departure area and a road map of the vicinity of a destination area to which a destination position pertains are loaded into the working memory area 6 from the road-map storing memory unit 4 and the departure-area route network data storing memory unit 5. In addition, the working memory area 6 also serves as a working memory used by the route-search processing unit 7.

The route-search processing unit 7 shown in FIG. 1 searches the road map of the vicinity of the departure area, the road map of the vicinity of the destination area and the departure-area route network loaded into the working memory area 6 for an optimum route from the destination position to the departure position. Here, known techniques such as Dijkstra's method or the potential method are adopted for searching for the optimum route. Since the regions between the departure and destination areas to be searched for the route are limited to the departure-area route network, a substantially high route-search speed is expected in comparison with an operation to find out a route by merely searching a road map. In actuality, the search of the departure-area route network for an optimum route is carried out by selecting only roads on a road map by checking link-usability flags in route data which roads each have a flag indicating a usable link. Since the departure-area route network is a logical sum of route trees, by starting the search for an optimum route from the destination-area side in the direction of a centripetal force toward the departure area, the search can be carried forward in the direction to the departure area without searching unnecessary branches. In general, the departure-area route network comprises meshes of a net in the vicinity of the departure position (or the present position). In this case, the vicinity of the departure position can be searched for an optimum route which avoids traffic jams on the roads thereof by utilizing dynamic traffic information, allowing a substitute route to be found out.

It is generally believed that reliable real-time traffic information is traffic information for a region up to a location separated by a traveling distance of about 30 minutes at the most from the departure position. For this reason, an area in the vicinity of a departure position to be searched for a substitute route is considered to be within a distance from the departure position in the range 20 to 30 Km.

Figure 15:
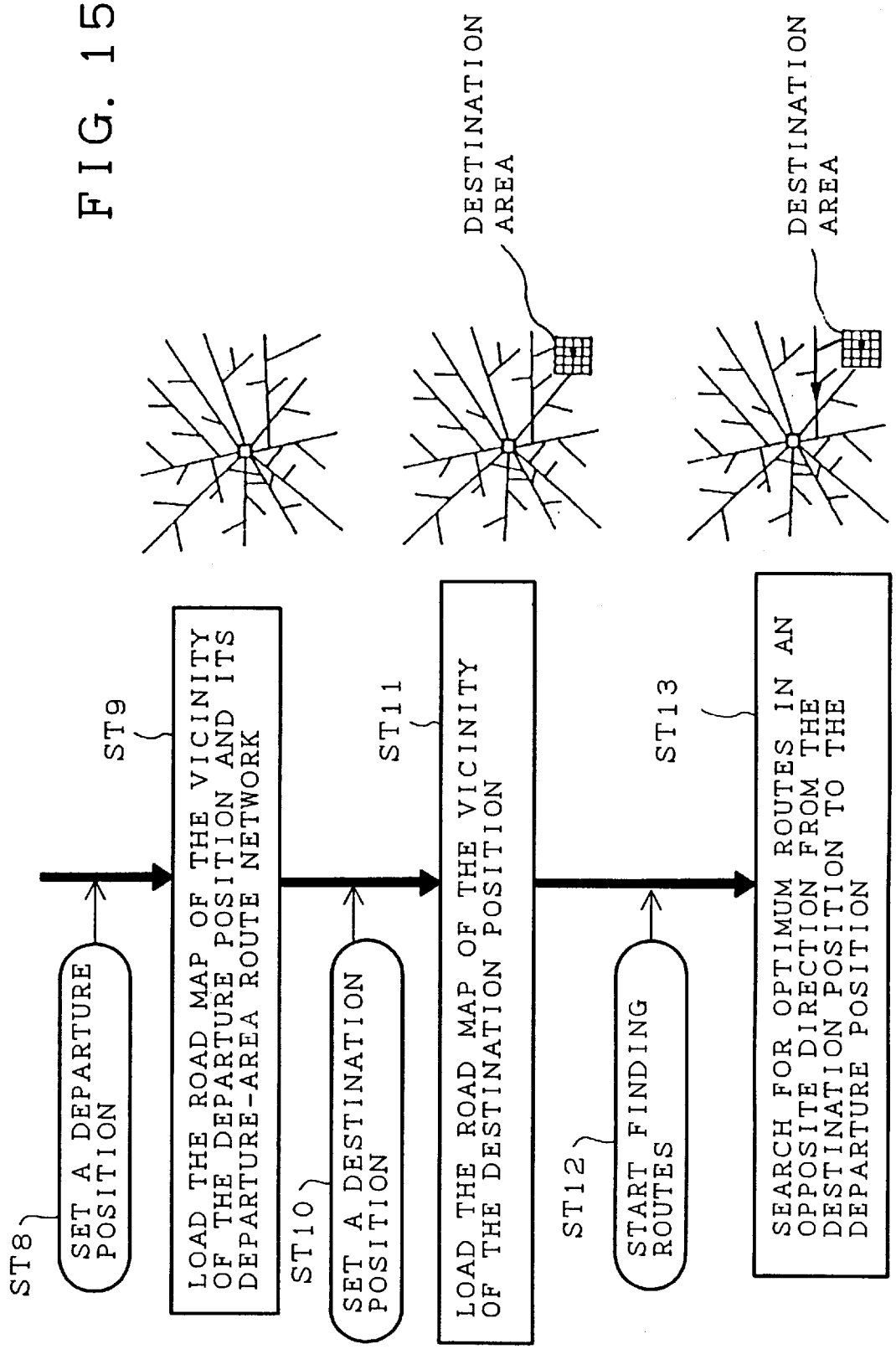
FIG. 15 is an explanatory view showing the operation of a route-search processing unit as implemented by the 1st embodiment according to the present embodiment.

Next, the flow of route finding processing carried out by the vehicle-route computing apparatus by searching a departure-area route network is explained by referring to FIG. 15. A flowchart of route finding is shown on the left side of the figure whereas an explanatory view explaining operations carried out at each step of the flowchart is shown on the right side of the figure.

The present position of the vehicle is regarded as a departure position. It can also be assumed that, in the vehicle mounting the vehicle-route computing apparatus, the present position is set as a departure position automatically in an operation of setting a departure position before the driver requests the route finding processing such as setting a destination position and starting the search for an optimum route.

When the driver sets a departure position (or the present position) by means of the departure-position setting unit 1 at a step ST8 of the flowchart, the departure-area determining unit 3 determines a departure area to which the departure position pertains. The processing flow then proceeds to a step ST9. At this step, road-map data of the departure area is loaded into the working memory area 6 from the road-map storing memory unit 4. In addition, a departure-area route network is loaded into the working memory area 6 from the road-map storing memory unit 4 and the departure-area route network data storing memory unit 5. In actuality, a departure-area route network comprises road-map data and route data as described previously. Thus, route data from the departure area to all destination areas is loaded into the working memory area 6 from the departure-area route network data storing memory unit 5 and road-map data within a range corresponding to the route data is loaded into the working memory area 6 from the road-map storing memory unit 4.

The processing flow then proceeds to a step ST10. When the driver sets a destination position by means of the destination-position setting unit 2 at this step, the flow continues to a step ST11 to load a road map of the destination area and the vicinity thereof to which destination area the destination position pertains, that is a trimmed-road zone with its branches trimmed, into the working memory area 6 from the road-map storing memory unit 4. The flow then proceeds to a step ST12. When the driver requests that the route finding be started at this step, the flow continues to a step ST13 to carry forward a search operation starting from the destination position in a direction opposite to the traveling direction of the vehicle. The operation begins with the search of roads in the vicinity of the destination position to be continued with the search of the departure-area route network for the present position before ending the search of roads in the vicinity of the departure position. As described previously, in actuality, the search of the departure-area route network of the present position for an optimum route is carried out by selecting only roads on the road map by checking link-usability flags in route data which roads each have a flag indicating a usable link. Much like the conventional search for an optimum route in a direction opposite to the traveling direction of the vehicle, this search for an optimum route to the departure position is ended at the time the present position is reached.

It should be noted that, much like the conventional search for an optimum route, this search can also be started from either the departure, the destination position or both positions. That is to say, the search for an optimum route can be carried out in both the directions. In additions, regions to be searched can also be limited as well.

It is obvious from the route finding flowchart described above that the road map of the departure-area route network for the present position and the roads in the vicinity of the departure position (or the present position) can be loaded into the working memory area 6 in advance. In this way, processings which remain to be carried out after the driver sets a destination position are loading of the road map of roads in the vicinity of the destination position into the working memory area 6 and the operations to search for an optimum route only, allowing the route finding to be completed in a shorter time.

Here, an example in which information on a departure-area route network including all destination positions for a certain departure position is loaded temporarily into the working memory area 6 has been explained. In case the step ST9 is carried out after the step ST10 carried, if at the step ST9, processing that utilizes information on the destination position in the processing of setting the destination position carried out at the step ST10 is performed, only a departure-area route network that limits directions and the like for the specific destination position needs to be loaded, allowing the use of the working memory area 6 with a small storage capacity.

In addition, the 1st embodiment is applied to a case in which an optimum route for the vehicle is found by means of an onboard vehicle-route computing apparatus at a request made by the driver. It should be noted, however, that the scope of the present invention is not limited to such a case. The present invention can also be applied to route computing apparatuses in other applications such as walking navigators or centrally determined route guidance system.

Embodiment 2

Next, another embodiment provided by the present invention, a 2nd embodiment, is explained.

In a vehicle-route computing apparatus according to the 2nd embodiment, departure-area route networks are made hierarchical by making departure areas hierarchical in order to further reduce the amount of route data stored in the departure-area route network data storing memory unit 5 employed in the vehicle-route computing apparatus implemented by the 1st embodiment, that is, in order to further decrease the storage capacity of the departure-area route network data storing memory unit 5. The departure areas are made hierarchical by utilizing the principle of similarity, that is, by taking advantage of the fact that the departure-area route network of the departure area being approached in the search for an optimum route has a shape similar to those of departure areas adjacent thereto. 5 For example, taking the vicinity of the city of Kyoto in Japan as a departure area will result in mostly the same routes on the east side of the city of Nagoya and the same routes on the west side of the city of Okayama as the routes obtained with the vicinity of the city of Osaka, which is close to the city of Kyoto, taken as a departure area.

In the departure-area route networks of two departure areas separated by a relatively short distance like the city of Kyoto and the city of Osaka described above, most of routes in regions remotely separated away from the departure areas can be considered to coincide with each other.

Here, a larger departure area is created by combining some departure areas which are close to each other. For example, the vicinity of the city of Kyoto is combined with the vicinity of the city of Osaka to form a Kansai departure area. For this larger departure area, a departure-area route network that covers every remote district in the country is then created. It is thus not necessary to create a departure-area route network for a small departure area which network includes all districts in the country. Further, since the number of departure-area route networks to be created for large departure areas to include all districts in the country can be reduced, the storage capacity of the memory for storing route data of all departure-area route networks can be decreased substantially.

Figure 16:
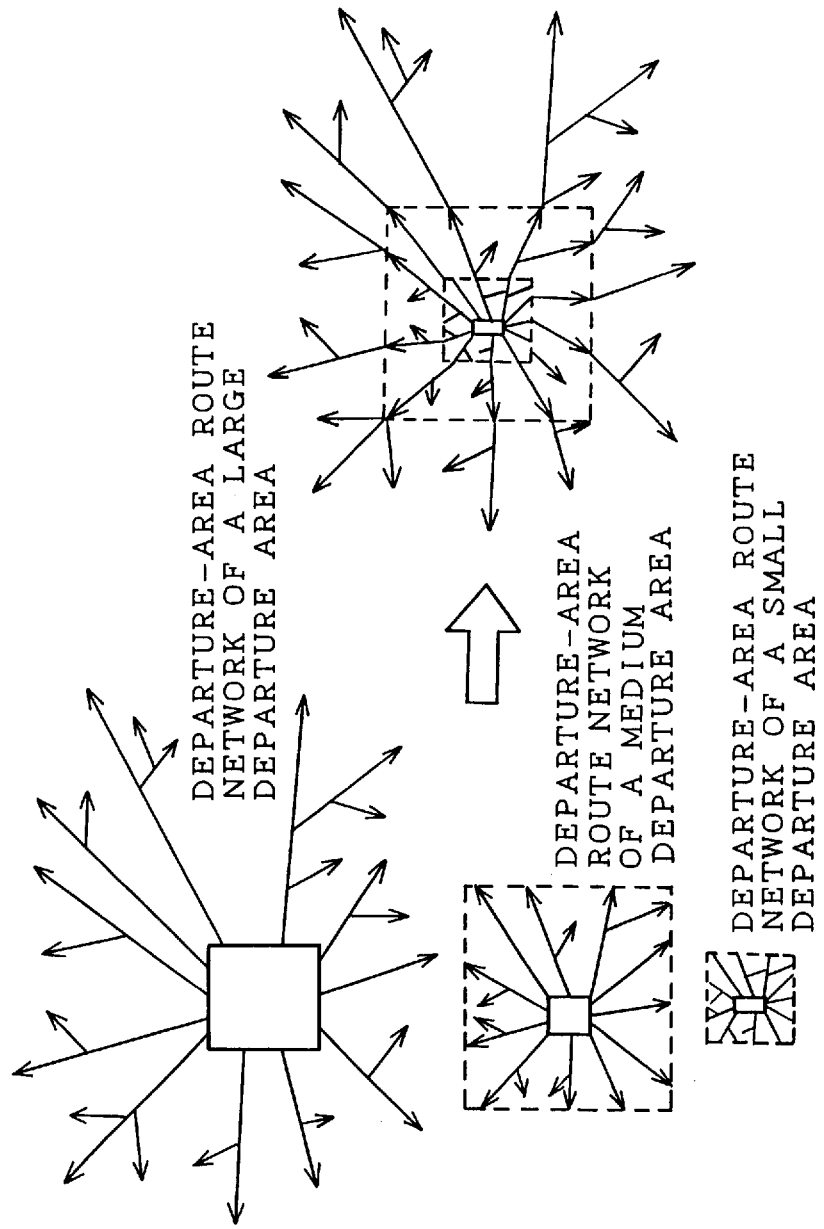
FIG. 16 is an explanatory view showing a technique to create a departure-area route network adopted by the 2nd embodiment according to the present embodiment.

FIG. 16 shows examples in which departure areas are classified into small, medium and large areas. A departure-area route network for a small departure area covers only regions in a narrow range around the small departure area. On the other hand, a departure-area route network for a medium departure area covers regions in a rather wide range around the medium departure area. As for a departure-area route network for a large departure area, all districts in the country are covered. The departure-area determining unit 3 determines the small, medium and large departure areas in which the vehicle is driven by the driver and the route-search processing unit 7 loads the correct departure-area route network of the departure area into the working memory area 6 accordingly.

A view on the right side of FIG. 16 shows a total departure-area route network of routes from a small departure area to destination areas all over the country which total network is obtained by superimposing three departure-area route networks shown on the left side one upon another.

Figure 17:
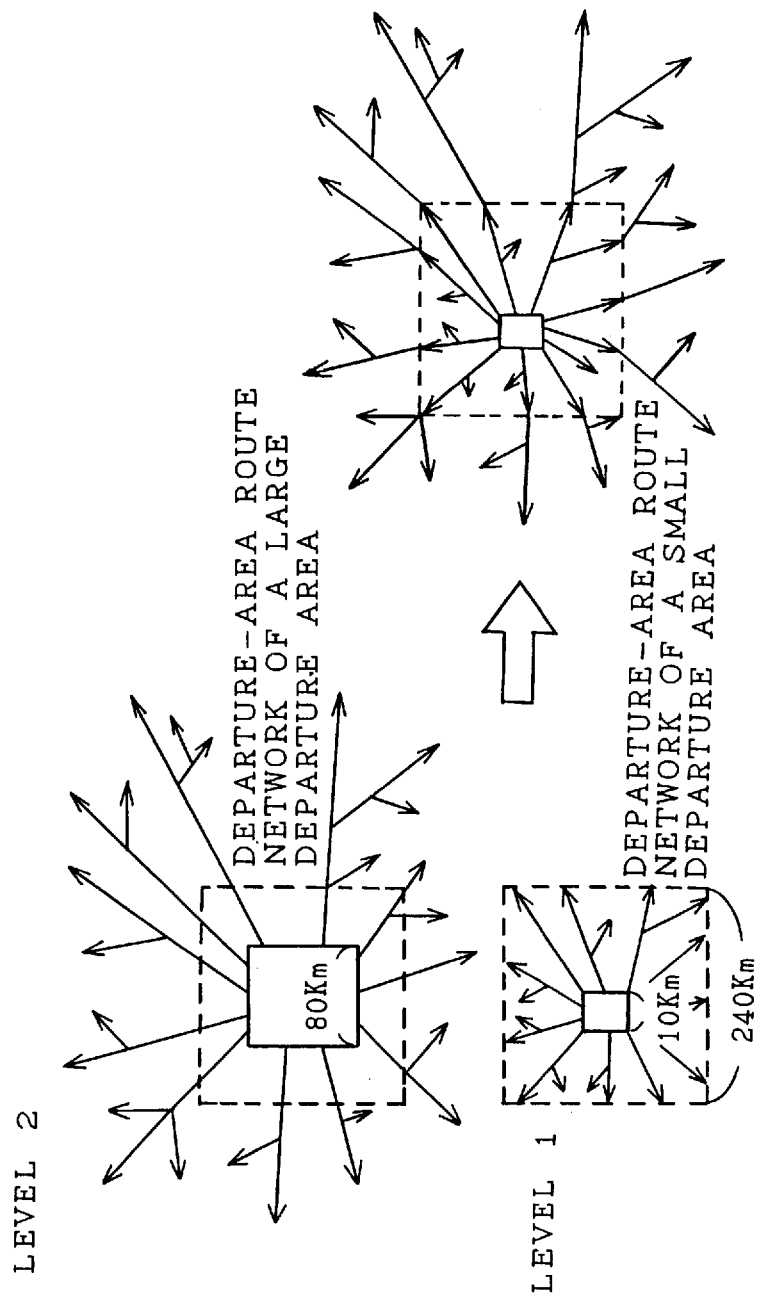
FIG. 17 is an explanatory view showing a technique to create a departure-area route network adopted by the 2nd embodiment according to the present embodiment.

Next, a method of creating a departure-area route network with departure areas divided into two hierarchical levels is explained in detail by referring to FIG. 17.

As shown in the figure, two kinds of departure areas are provided. One of them is a typically square small departure area with dimensions of 10 Km×10 Km=100 square Km, a small area about equal in size to a mesh of level 0. The other is a typically square large departure area with dimensions of 80 Km×80 Km=6,400 square Km, a large area about equal in size to a mesh of level 1. The departure-area route network for the small departure area covers a square area with dimensions of 240 Km×240 Km=57,600 square Km which square area is obtained by combining a plurality of meshes of roads at level 1 in the vicinity of the small departure area. On the other hand, the departure-area route network for the large departure area exhaustively covers roads of level 2 of all over the country.

Figure 18:
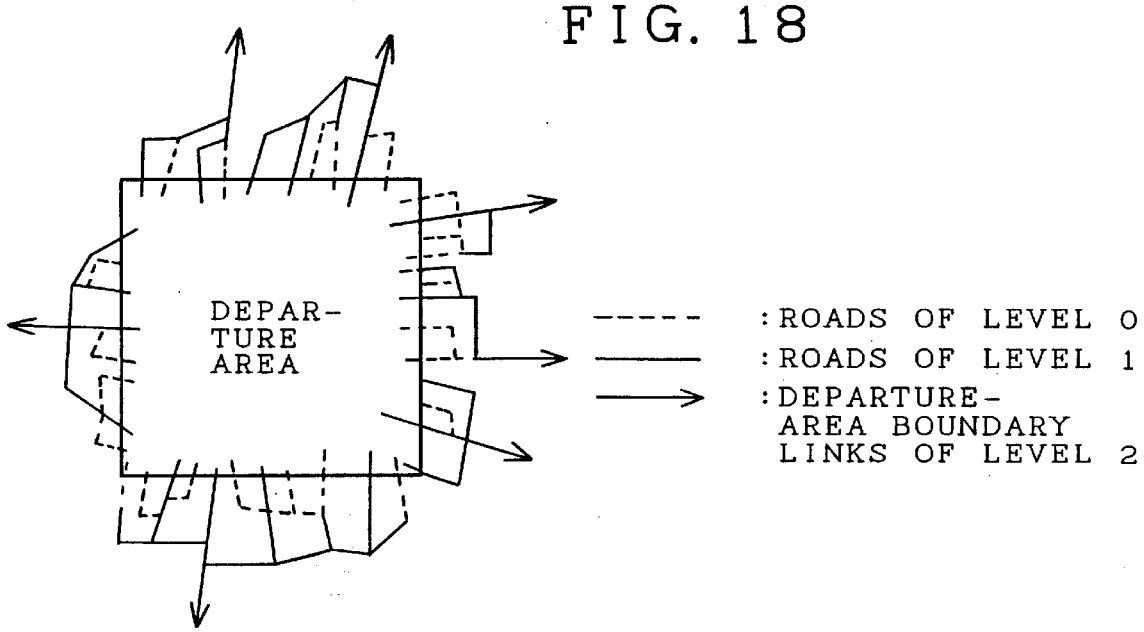
FIG. 18 is an explanatory view showing a technique to create a departure-area route network adopted by the 2nd embodiment according to the present embodiment.

In order to shorten the time required for executing off-line computation, the departure-area route network of the large departure area is created from a road map of level 2. Naturally, however, since a departure-area route network comprises routes from all links on the boundary of the departure area to boundary links of all destination areas, on the boundary of the departure area, links of level 0 indicated by dotted lines and links of level 1 indicated by thin solid lines are associated with a link of level 2 indicated by a thick solid line as shown in FIG. 18.

Similarly, links of levels 0 and 1 are associated with links of level 2 on the area boundary on the destination-area side. With the association of boundary links taken as a base, first of all, a recommended route from a boundary link of a departure area to a destination area is found. Then, this process is repeated to find recommended routes to the same destination area for all boundary links of the departure area. Finally, the process of finding recommended routes for all the boundary links of the departure area is repeated to find a logical sum of recommended routes for all destination areas by the principle of superposition. The logical sum which is obtained by superposition of recommended routes found in this way is the departure-area route network of the large departure area.

The departure-area route network of the small departure area is created from a road map of level 1. Much like the departure-area route network of a large departure area, on area boundaries, links of level 0 are associated with a link of level 1.

Next, flows of the route finding processing carried out by a vehicle-route computing apparatus mounted on a vehicle, which apparatus utilizes hierarchical departure-area route networks in the processing, are explained by referring to FIGS. 15, 19, 20 and 21.

Figure 20:
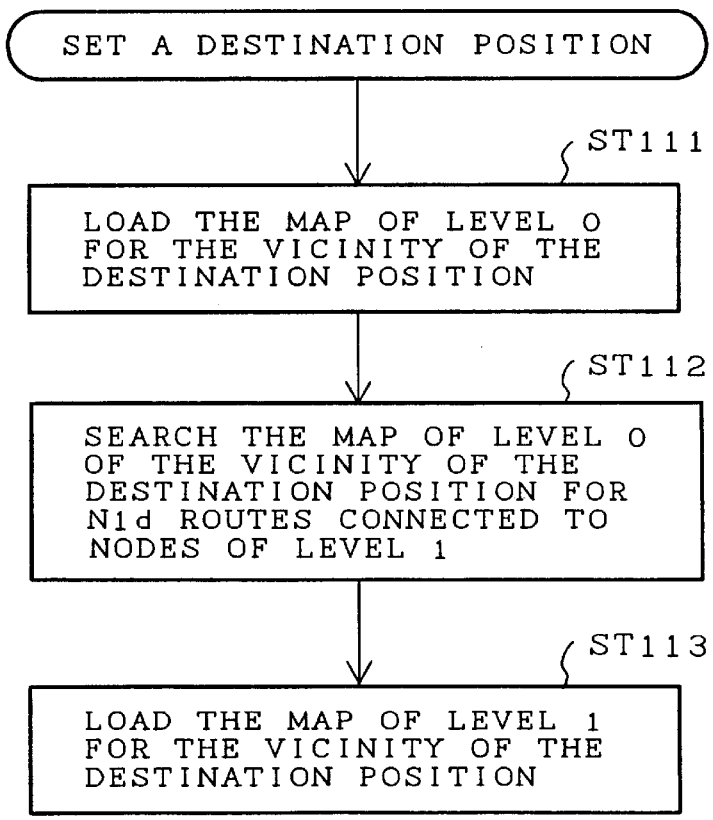
FIG. 20 is a flowchart showing the operation of the route-search processing unit as implemented by the 2nd embodiment according to the present embodiment.
Figure 19:
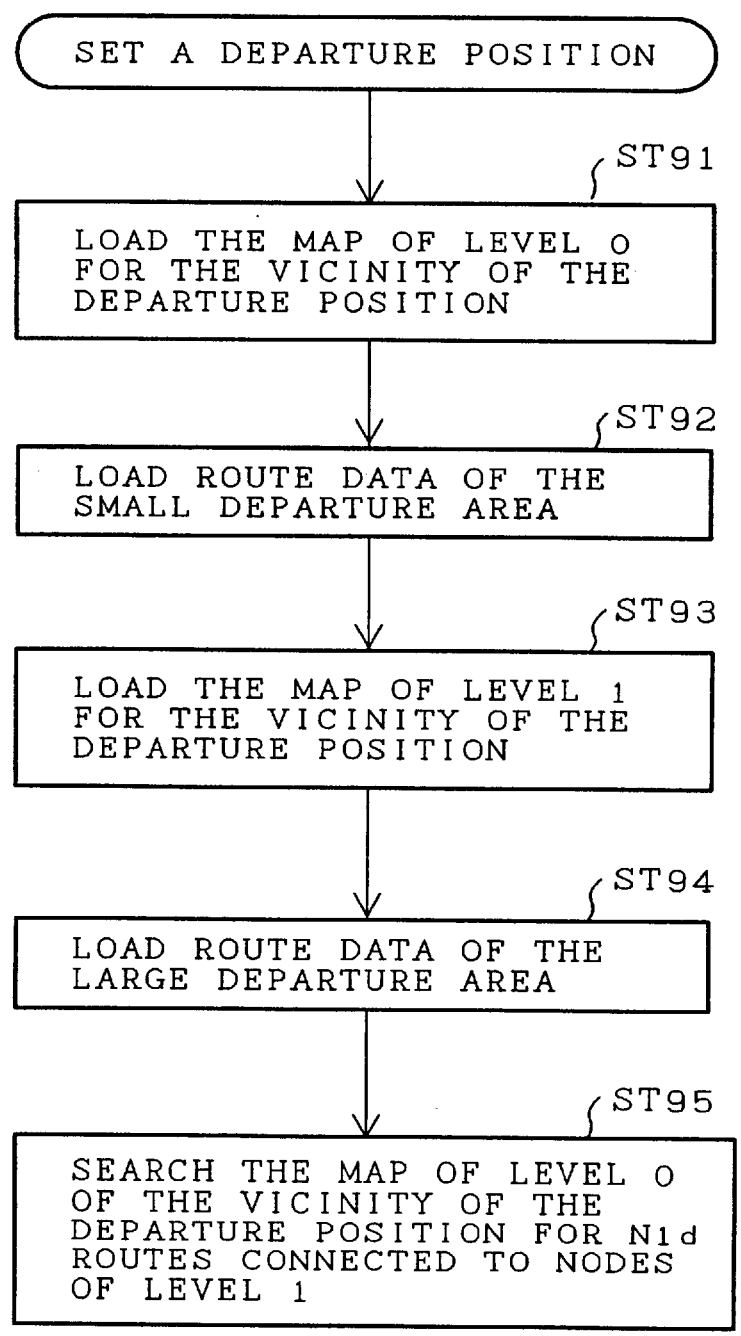
FIG. 19 is a flowchart showing the operation of a route-search processing unit as implemented by a 2nd embodiment according to the present embodiment.
Figure 21:
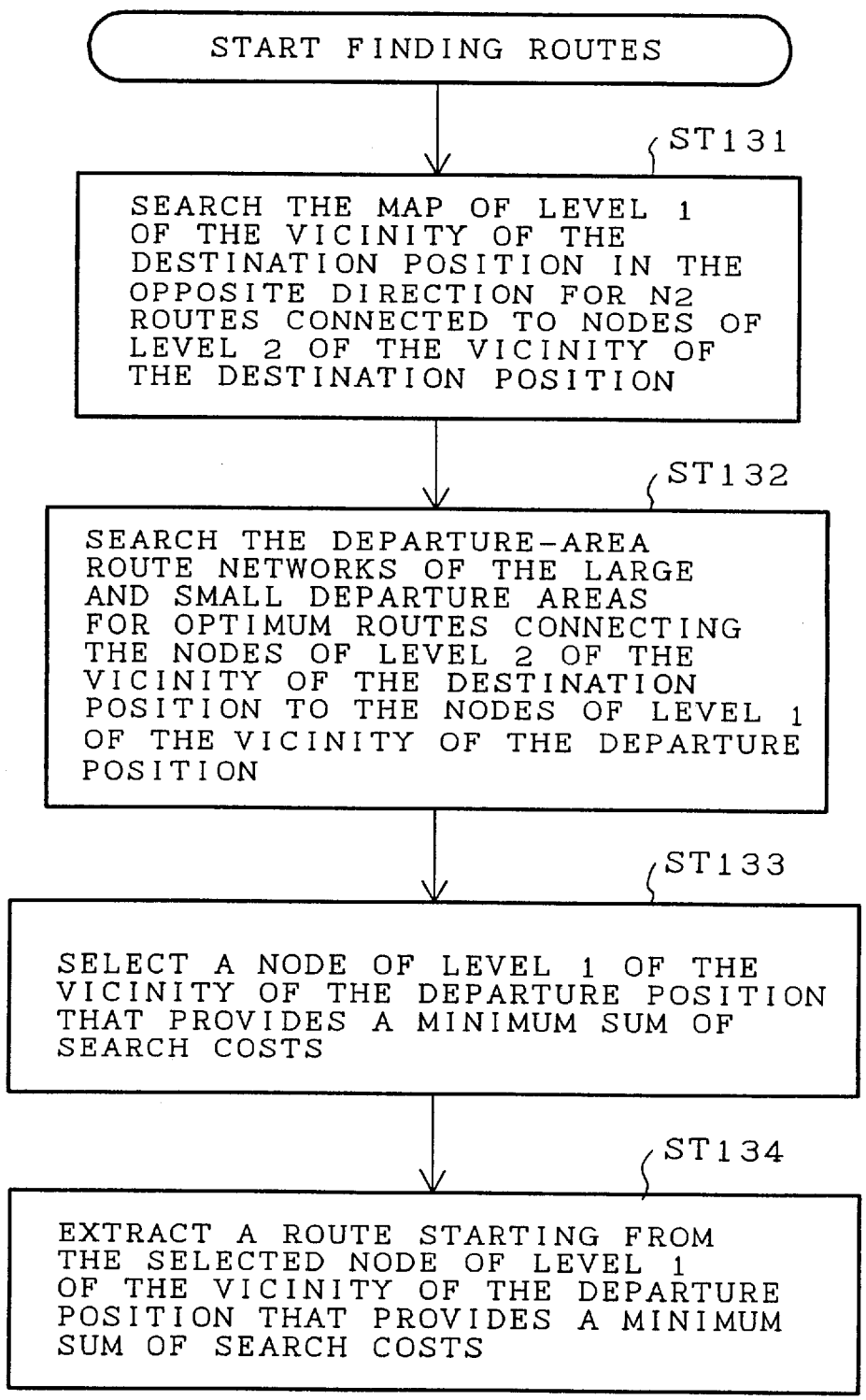
FIG. 21 is a flowchart showing the operation of the route-search processing unit as implemented by a 2nd embodiment according to the present embodiment.

FIGS. 19, 20 and 21 show detailed flowcharts of the processings carried out at the steps ST9, ST11 and ST13 respectively of the flowchart shown in FIG. 15.

First of all, at a stage where a navigation system is activated in the vehicle either at a request made by the driver or when predetermined conditions are satisfied, data of a road map of level 2 is all loaded from the road-map storing memory unit 4 into the working memory area 6.

When a departure position (that is, the present position) is established at the step ST8 of the flowchart shown in FIG. 15, data of a road map of level 0 for the vicinity of the departure position is loaded from the road-map storing memory unit 4 into the working memory area 6 at a step ST91 of the flowchart shown in FIG. 19. The flow then continues to a step ST92 to load route data of a departure-area route network of a small departure area from the departure-area route network data storing memory unit 5 into the working memory area 6. The flow then continues to a step ST93 to load data of a road map of level 1 for the vicinity of the departure position from the road-map storing memory unit 4 into the working memory area 6. In conjunction with the route data loaded at the step ST92, the data of a road map of level 1 loaded at the step ST93 serves as a departure-area route network of a small departure area. The flow then proceeds to a step ST94 to load route data of a departure-area route network of a large departure area from the departure-area route network data storing memory unit 5 into the working memory area 6. In conjunction with the data of a road map of level 2 loaded at the navigation-system activating stage, the route data loaded at the step ST94 serves as a departure-area route network of a large departure area.

The flow then continues to a step ST95 to search the road map of level 0 for the vicinity of the departure position for up to N1d routes from the departure position which routes are connected to nodes of level 1 in the vicinity of the departure position.

The flow then proceeds to the step ST10 of the flowchart shown in FIG. 15. When a destination position is set at the step ST10, data of a road map of level 0 for the vicinity of the destination position is loaded from the road-map storing memory unit 4 into the working memory area 6 at a step ST111 of the flowchart shown in FIG. 20. The flow then continues to a step ST112 to search the road map of level 0 for the vicinity of the destination position from the destination position in a direction opposite to the traveling direction of the vehicle for up to N1d routes which are connected to nodes of level 1 in the vicinity of the destination position. The flow then continues to a step ST113 to load data of a road map of level 1 for the vicinity of the destination position from the road-map storing memory unit 4 into the working memory area 6.

The flow then proceeds to the step ST12 of the flowchart shown in FIG. 15. When the driver requests that the route finding be started at this step, first of all, at a step ST131 of the flowchart shown in FIG. 21, the road map of level 1 of the vicinity of the destination position is searched in a direction opposite to the traveling direction of the vehicle from up to N1d nodes identified at the step ST112 in the road map of level 1 in the vicinity of the destination position for up to N2 routes which are connected to nodes of level 2 in the departure-area route network of the large departure area.

The flow then continues to a step ST132. At this step, roads of level 2 in the departure-area route network of the large departure area and roads of level 1 in the departure-area route network of the small departure area in the vicinity of the departure position are searched for optimum routes connecting up to N2 nodes of level 2 identified at the step ST131 to up to N1d nodes of level 1 identified at the step ST95 in the vicinity of the departure position.

The flow then continues to a step ST133 to select, from the nodes of level 1 in the vicinity of the departure position, a node that minimizes the sum of the cost of the search from the departure position and the cost of the search to the destination position. The flow then continues to a step ST134 to extract a route from the departure position to the node selected at the step ST133 and a route from the selected node to the destination position. By concatenating these two routes, an optimum route from the departure position to the destination position can be obtained.

As described above, in the vehicle-route computing apparatus according to the 2nd embodiment, departure-area route networks are made hierarchical by making departure areas hierarchical in order to substantially reduce the amount of route data stored in the departure-area route network data storing memory unit 5 employed in the vehicle-route computing apparatus implemented by the 1st embodiment, that is, in order to substantially decrease the storage capacity of the departure-area route network data storing memory unit 5. The departure areas are made hierarchical by utilizing the principle of similarity, that is, by taking advantage of the fact that the departure-area route network of the departure area being approached in the search for an optimum route has a tree-like shape similar to those of departure areas adjacent thereto.

Embodiment 3

Figure 22:
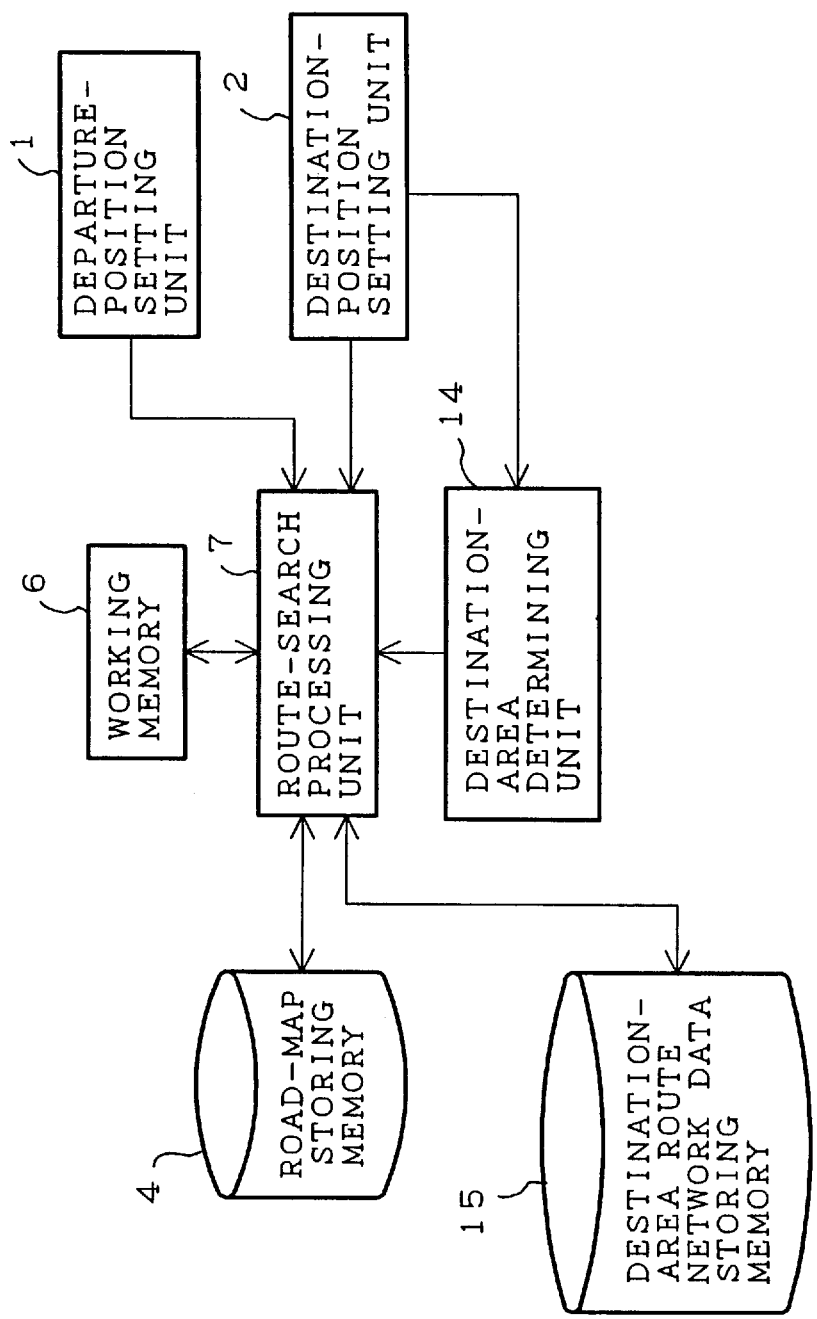
FIG. 22 is a diagram showing the configuration of a vehicle-route computing apparatus as implemented by a 3rd embodiment according to the present invention.

FIG. 22 is a diagram showing the configuration of a vehicle-route computing apparatus as implemented by a 3rd embodiment provided by the present invention.

Reference numeral 14 is a destination-area determining unit serving as a destination-area determining means for determining a destination area, an area to which the destination position pertains. Reference numeral 15 is a destination-area route network data storing memory unit serving as a destination-area route network storage means for storing destination-area route network data (that is, data of a destination-area route network comprising routes from a plurality of departure areas to one destination area) for each destination area.

In the case of the vehicle-route computing apparatus implemented by the 3rd embodiment, in place of the departure-area route network used in the vehicle-route computing apparatus implemented by the 1st embodiment, routes from a plurality of departure areas to one destination area are computed off-line as a destination-area route network and results of the computation are stored in the destination-area route network data storing memory unit 15 in advance.

A destination-area route network is computed in a way similar to that for a departure-area route network. First of all, a recommended route from a boundary link of a departure area to a destination area is found. Then, this process is repeated to find recommended routes to the same boundary link of the destination area for all departure areas. The logical sum of the recommended routes from all the departure areas to the same boundary link of the destination area is then computed by the principle of superposition.

The process to compute the logical sum of the recommended routes from all the departure areas to the same boundary link of the destination area is finally repeated for all boundary links of the same destination area. The logical sum of the recommended routes from all the departure areas to all the boundary links of the same destination area is then computed by the principle of superposition to result in a destination-area route network representing recommended routes from all the departure areas to the destination area.

As an alternative, recommended routes from all the departure areas to the destination area are found by treating the vicinity of the departure area as a trimmed-road zone. This process is then repeated for all departure areas. Finally, the logical sum of recommended routes from all the departure areas to the destination area is computed by the principle of superposition.

As an example, a destination-area route network is found with the vicinity of the city of Amagasaki taken as a destination area to give a result similar to what is shown in FIG. 10 except that the departure area shown in the figure now becomes a destination area.

Much like the departure-area route network, as properties of the destination-area route network, the vicinity of the destination area has a network-like form and remote districts separated by long distances from the destination area form a tree-like shape.

Much like the vehicle-route computing apparatus implemented by the 1st embodiment, the destination-area route network created by means of the techniques described above is stored in the road-map storing memory unit 4 and the destination-area route network data storing memory unit 15 in the formats of road-map data and route data respectively.

It should be noted that in order to further reduce the amount of route data stored in the destination-area route network data storing memory unit 15 employed in the vehicle-route computing apparatus implemented by the 3rd embodiment, that is, in order to further decrease the storage capacity of the destination-area route network data storing memory unit 15, destination-area route networks are made hierarchical by making destination areas hierarchical by means of the technique adopted for the vehicle-route computing apparatus implemented by the 2nd embodiment described earlier. The destination areas are made hierarchical by utilizing the principle of similarity, that is, by taking advantage of the fact that the destination-area route network of the destination area being approached in the search for an optimum route has a tree-like shape similar to those of destination areas adjacent thereto. By making the destination areas hierarchical, the destination-area route network of a small destination area does not have to cover districts all over the country and, Further, the number of destination-area route networks for large destination areas can be reduced. As a result, the storage capacity of the destination-area route network data storing memory unit 15 can be reduced substantially.

Figure 23:
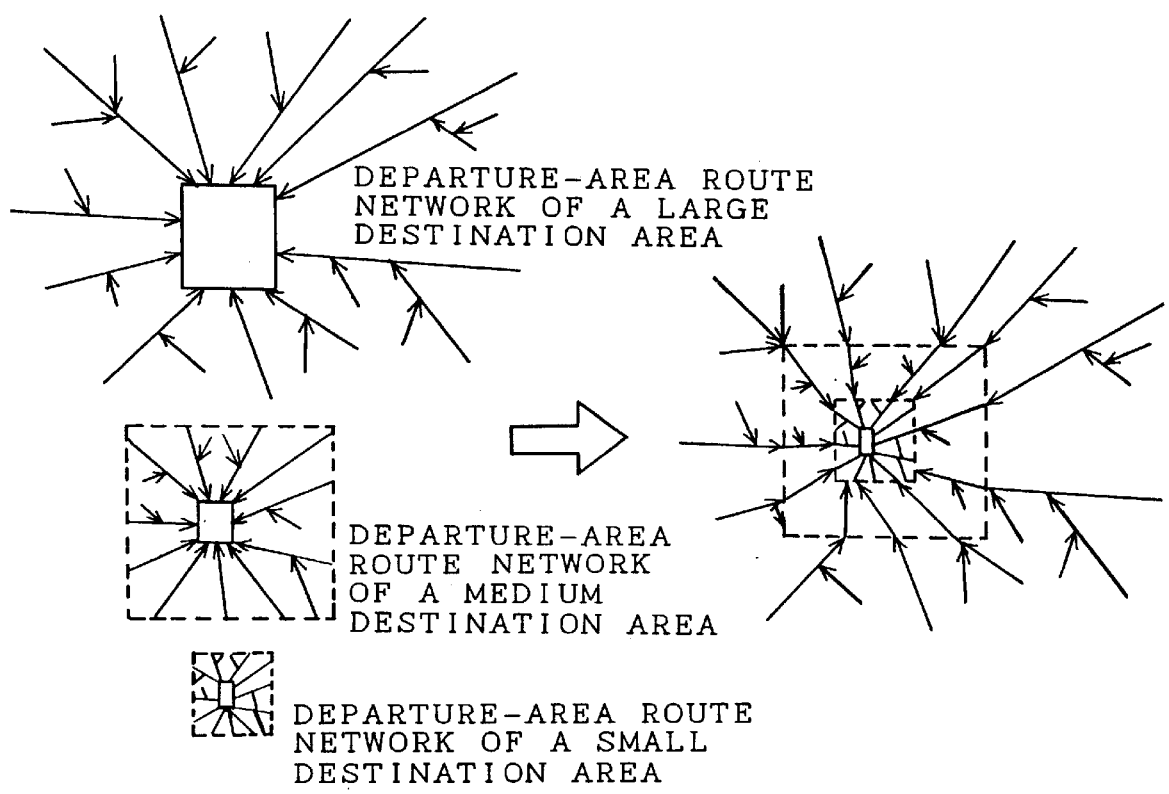
FIG. 23 is an explanatory view showing another configuration of a destination-area route network of the 3rd embodiment according to the present invention.

FIG. 23 shows examples in which destination areas are classified into small, medium and large areas. A destination-area route network for a small destination area covers only regions in a narrow range around the small destination area. On the other hand, a destination-area route network for a medium destination area covers regions in a rather wide range around the medium destination area. As for a destination-area route network for a large destination area, all districts in the country are covered. The destination-area determining unit 14 determines the small, medium and large destination areas to which the destination position pertains and the route-search processing unit 7 loads the correct destination-area route network of the destination area into the working memory area 6 accordingly. A view on the right side of FIG. 23 shows a destination-area route network of routes from a small destination area to destination areas all over the country which network is obtained by superimposing the destination-area route networks shown on the left side one upon another.

Figure 24:
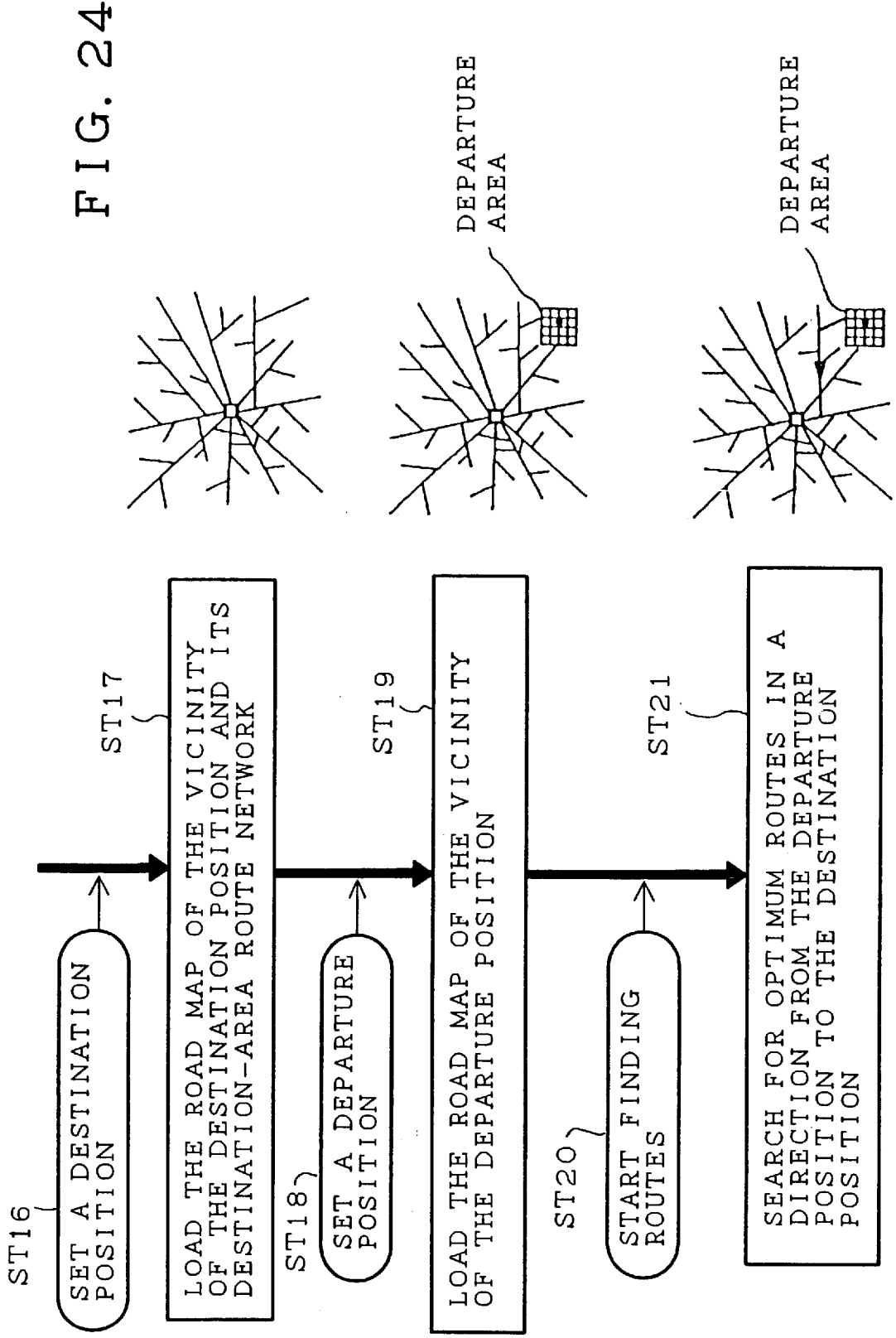
FIG. 24 is a flowchart showing the operation of a route-search processing unit as implemented by a 3rd embodiment according to the present embodiment.

Next, the flow of the route finding processing carried out by the vehicle-route computing apparatus by using a destination-area route network is explained by referring to FIG. 24.

A flowchart of the route finding is shown on the left side of the figure whereas an explanatory view explaining operations carried out at each step of the flowchart is shown on the right side of the figure.

When the driver sets a destination position by means of the destination-position setting unit 2 at a step ST16 of the flowchart, the destination-area determining unit 14 determines a destination area to which the destination position pertains. The processing flow then proceeds to a step ST17. At this step, the road-map data of the destination area is loaded into the working memory area 6 from the road-map storing memory unit 4. In addition, road-map data and route data constituting the destination-area route network of the destination area are loaded into the working memory area 6 from the road-map storing memory unit 4 and the destination-area route network data storing memory unit 15 respectively.

In actuality, a destination-area route network comprises road-map data and route data. Thus, route data from the destination area to all departure areas is loaded into the working memory area 6 from the destination-area route network data storing memory unit 15 and road-map data within a range corresponding to the route data is loaded into the working memory area 6 from the road-map storing memory unit 4. Here, destination-area route networks for small, medium and large destination areas are loaded into the working memory area 6. If information on the departure position can be utilized at the step ST17 of the flow, however, only the destination-area route network of the hierarchical level that is required as a minimum in accordance with the departure position needs to be loaded into the working memory area 6. In this way, the portion of the working memory area 6 required for temporarily storing the destination-area route network can be reduced.

The processing flow then proceeds to a step ST18. When the driver sets a departure position by means of the departure-position setting unit 1 at this step, the flow continues to a step ST19 to load a road map of the departure area and the vicinity thereof to which the departure position pertains, that is a trimmed-road zone with its branches trimmed, into the working memory area 6 from the road-map storing memory unit 4. The flow then proceeds to a step ST20. When the driver requests that the route finding be started at this step, the flow continues to a step ST21 to carry forward a search operation starting from the departure position in the traveling direction of the vehicle. The operation begins with the search of roads in the vicinity of the departure position to be continued with the search of the destination-area route network for the destination position before ending the search of roads in the vicinity of the destination position.

In actuality, the search of the destination-area route network of the destination position for an optimum route is carried out by selecting only roads on the road map by checking link-usability flags in route data which roads each have a flag indicating a usable link. This search for an optimum route to the destination position is ended at the time the destination position is reached.

With destination-area route networks made hierarchical, routes resulting from the calculation based on the principle of superposition have a tree-like shape, resulting in also an effect of reducing the necessity to search roads resembling meshes of a net in the vicinity of the destination position for an optimum route. This effect can be expected as well also in the case of hierarchical departure-area route networks described earlier.

The vehicle-route computing apparatus implemented by the 3rd embodiment utilizing destination-area route networks may indicate that a recommended route is missed during an actual drive time or it is desired to recalculate a route frequently at intervals of 10 minutes for example by using dynamic traffic information. Even in such cases, a route can be recalculated starting from the step ST18 by setting a departure area again by means of the destination-area route network already loaded into the working memory area 6 because the destination position does not change. Since it is not necessary to load the route data of the destination-area route network anew from the destination-area route network data storing memory unit 15, the operation to repeat the search for an optimum route can be carried out immediately.

Embodiment 4

Figure 25:
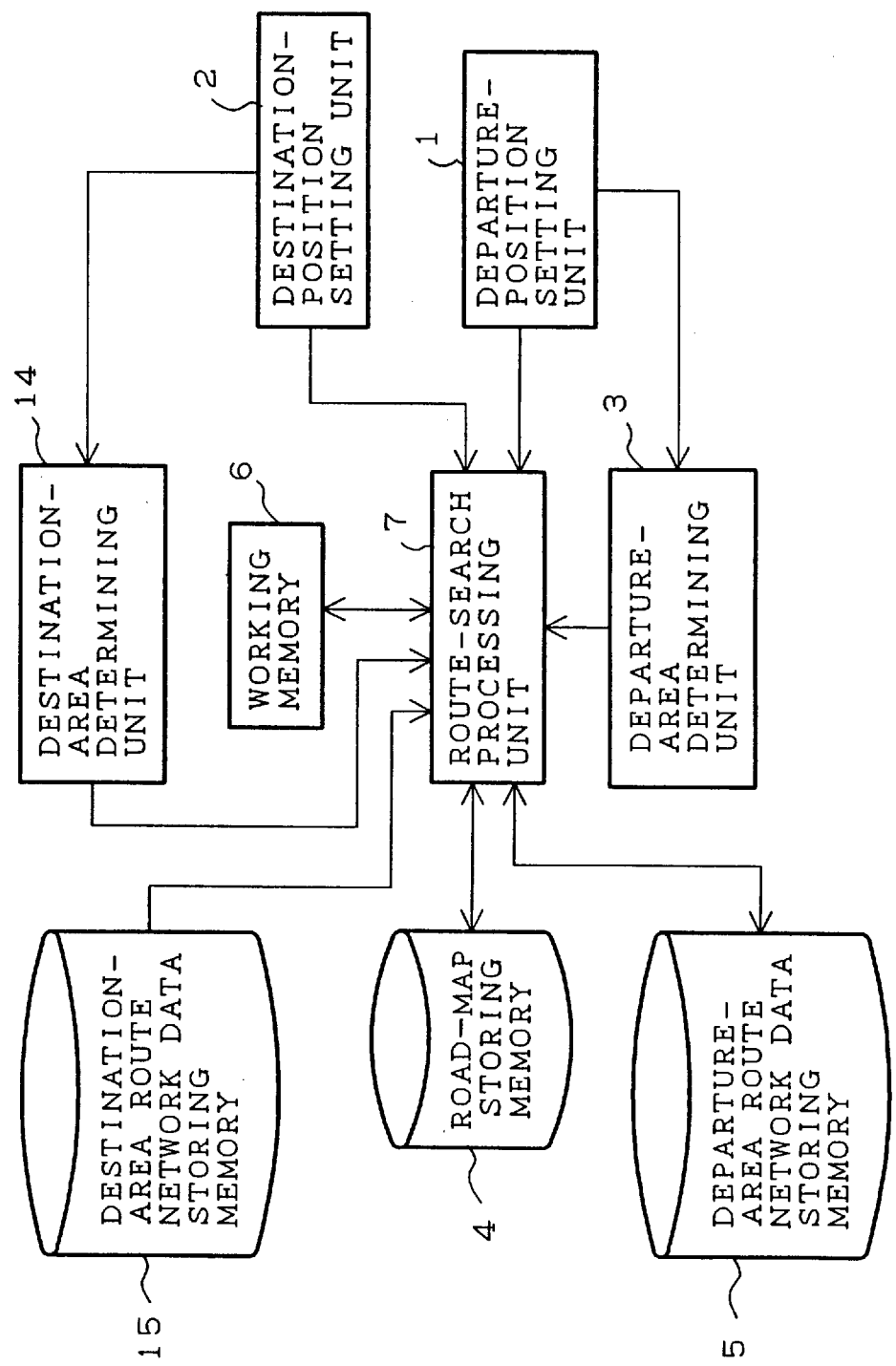
FIG. 25 is a diagram showing the configuration of a vehicle-route computing apparatus as implemented by a 4th embodiment according to the present invention.

FIG. 25 is a view showing the configuration of a vehicle-route computing apparatus as implemented by a 4th embodiment provided by the present invention.

The vehicle-route computing apparatus implemented by the 4th embodiment searches both the hierarchical departure-area route network of the 2nd embodiment and the hierarchical destination-area route network of the 3rd embodiment for a recommended route and provides the driver with a recommended route.

In the case of the vehicle-route computing apparatus implemented by the 2nd embodiment, the search of the vicinity of the destination area for an optimum route, that is, the search of the trimmed-road zone, which is eliminated in the creation of a departure-area route network of a large departure area, for an optimum route, is carried out by simply loading the road map of the trimmed-road zone in the vicinity of the destination area and searching the road map for an optimum route. In the case of the vehicle-route computing apparatus implemented by the 4th embodiment, on the other hand, a destination-area route network for a small destination area is searched for an optimum route instead.

Next, the flow of route finding processing carried out by the vehicle-route computing apparatus implemented by the 4th embodiment is explained by referring to FIG. 26.

A flowchart of the route finding is shown on the left side of the figure whereas an explanatory view explaining operations carried out at each step of the flowchart is shown on the right side of the figure.

When the driver sets a departure position by means of the departure-position setting unit 1 at a step ST22 of the flowchart, the flow continues to a step ST23 at which the departure-area determining unit 3 determines a departure area to which the departure position pertains. Also at this step, the road-map data of the departure area is loaded into the working memory area 6 from the road-map storing memory unit 4. In addition, road-map data and route data constituting the departure-area route network of the departure area are loaded into the working memory area 6 from the road-map storing memory unit 4 and the departure-area route network data storing memory unit 5 respectively. It should be noted that the loaded departure-area route network is a hierarchical network.

When the driver sets a destination position by means of the destination-position setting unit 2 at a step ST24 of the flowchart, the flow continues to a step ST25 at which the destination-area determining unit 14 determines a destination area to which the destination position pertains. Also at this step, the road-map data of the destination area is loaded into the working memory area 6 from the road-map storing memory unit 4. In addition, road-map data and route data constituting the destination-area route network of the destination area are loaded into the working memory area 6 from the road-map storing memory unit 4 and the destination-area route network data storing memory unit 15 respectively.

The flow then proceeds to a step ST26. When the driver requests that the route finding be started at this step, the flow continues to a step ST27 to carry forward a search operation starting from the destination position in a direction opposite to the traveling direction of the vehicle. The operation begins with the search of roads in the vicinity of the destination position to be continued with the search of the departure-area route network for the departure position before ending the search of roads in the vicinity of the departure position. Since the destination-area route network for the small destination area is stored in the working memory area 6, by using the destination-area route network for the small destination area, the search of roads in the vicinity of the destination area for an optimum route reaching the departure-area route network can be carried out with ease, allowing the search of roads in the vicinity of the destination area to be completed in a short time.

Details of the search for an optimum route carried out by the 4th embodiment are explained with a destination position separated by a long distance from the departure position.

Departure-area road maps and departure-area route networks are made hierarchical with the sizes at each hierarchical levels equal to those of the 2nd embodiment. In addition, the size of a destination area is a typically 10 Km×10Km=100 square Km, a size about the same as that of a mesh of level 0. The destination-area route network for the small departure area covers a square area with dimensions of 240 Km×240 Km=57,600 square Km which is obtained by combining a plurality of meshes of roads at level 1 in the vicinity of the small destination area. It should be noted that, typically, the size of a mesh of level 1 is 80 Km×80 Km=6,400 square Km.

Figure 27:
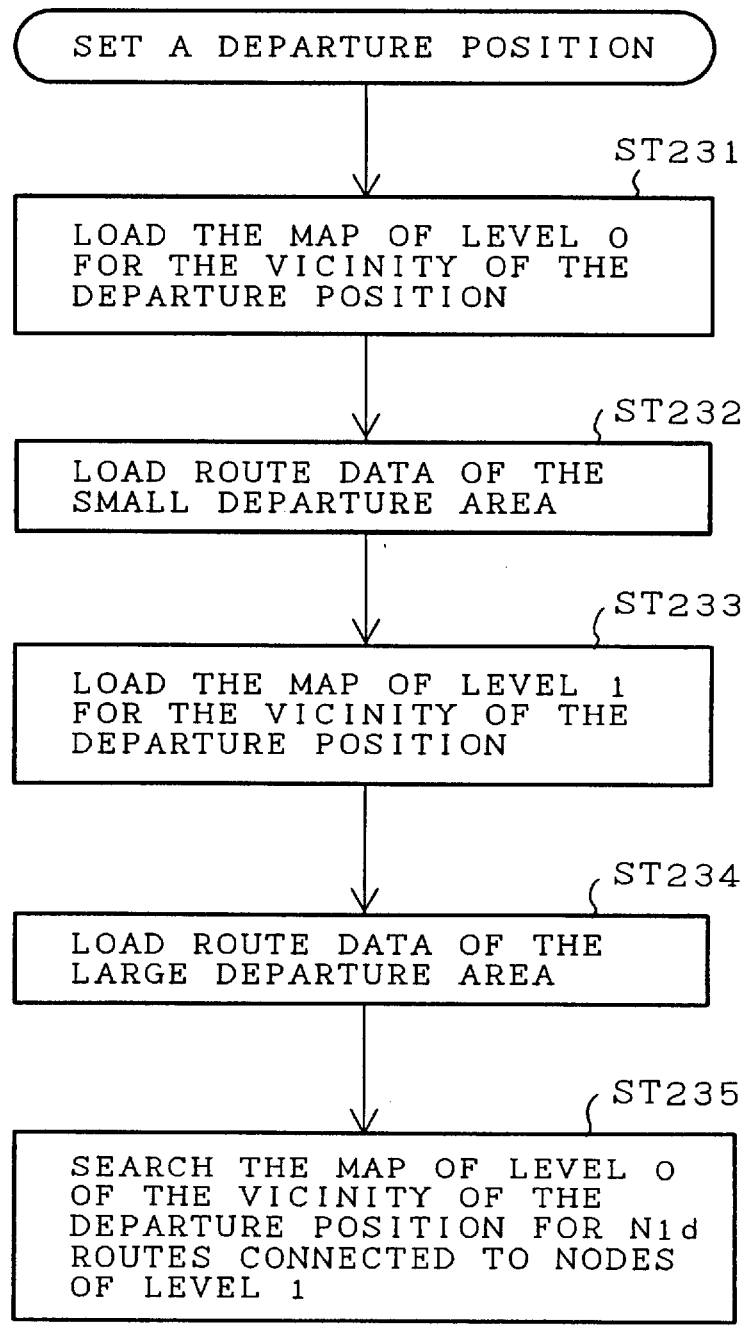
FIG. 27 is a flowchart showing the operation of a route-search processing unit as implemented by a 4th embodiment according to the present embodiment.
Figure 28:
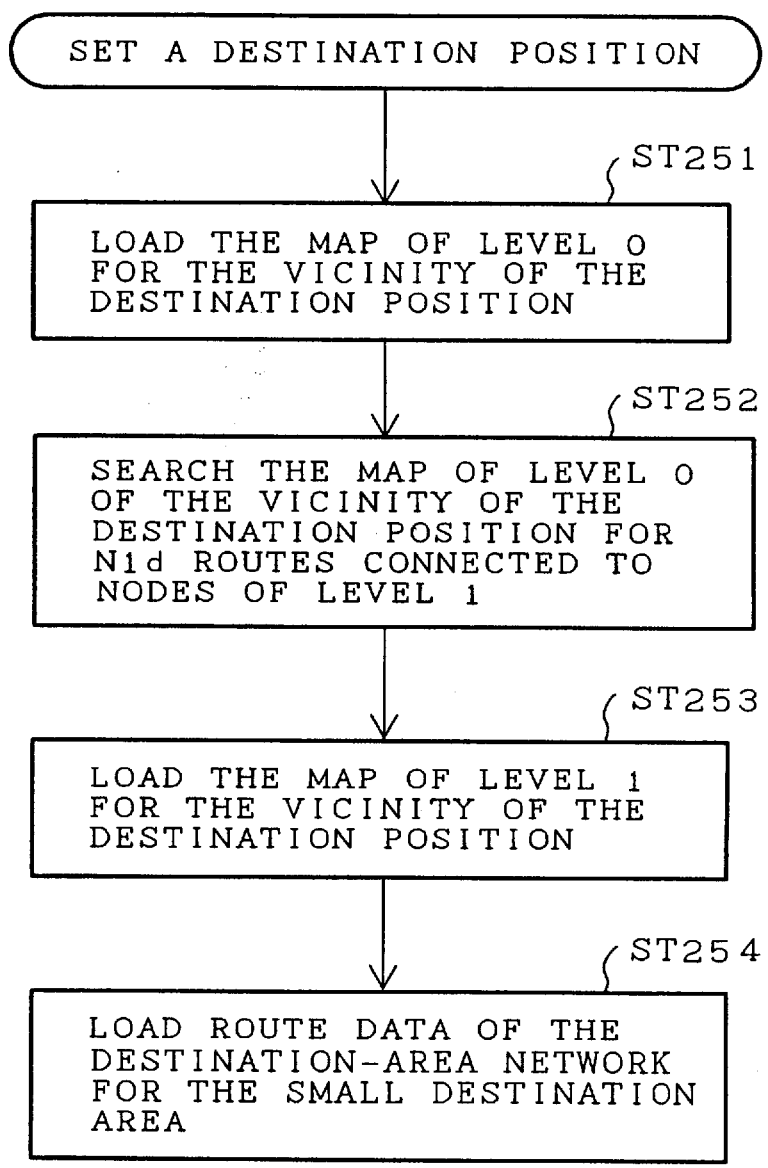
FIG. 28 is a flowchart showing the operation of the route-search processing unit as implemented by a 4th embodiment according to the present embodiment.
Figure 29:
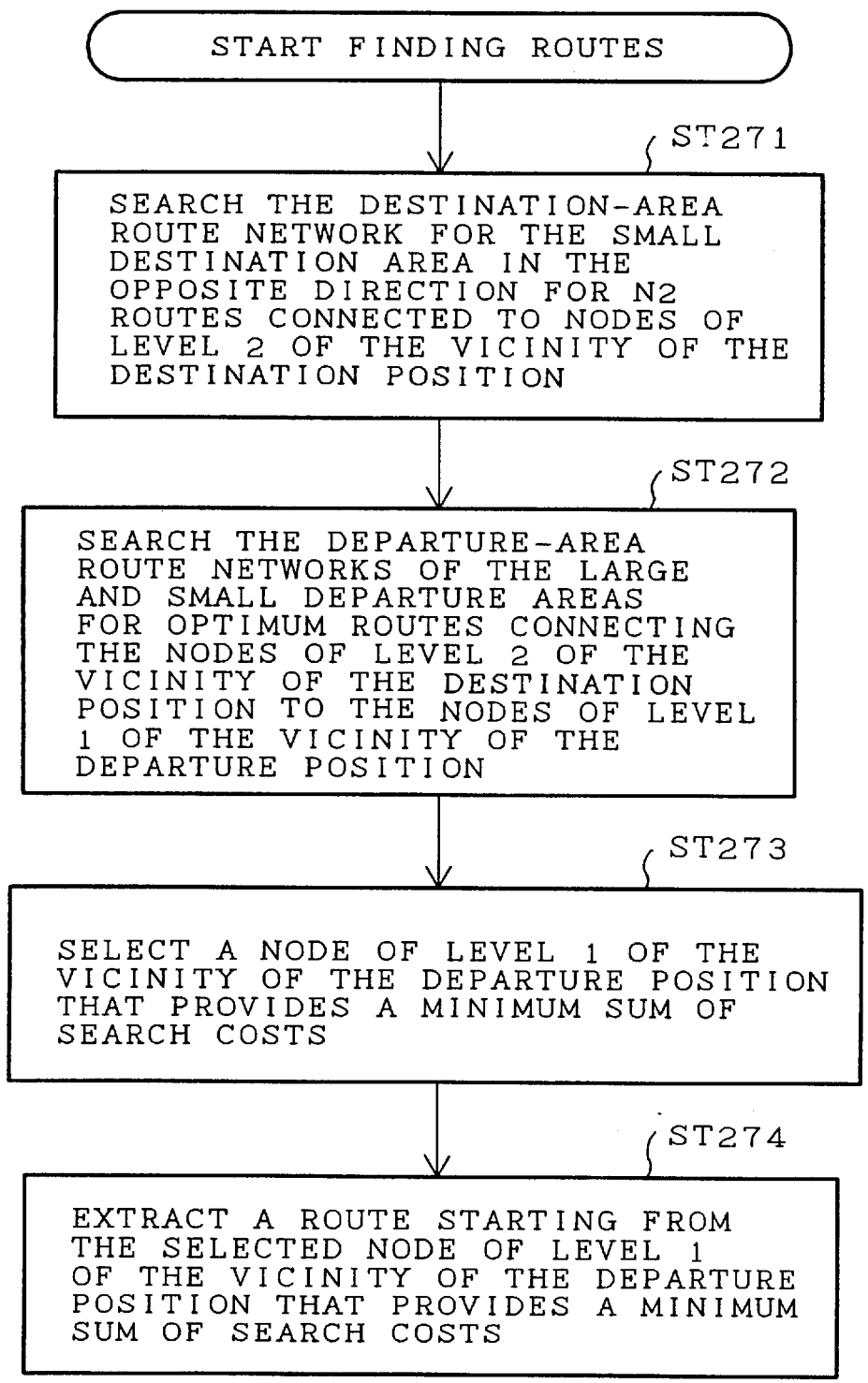
FIG. 29 is a flowchart showing the operation of the route-search processing unit as implemented by a 4th embodiment according to the present embodiment.

FIGS. 27, 28 and 29 show detailed flowcharts of the processings carried out at the steps ST23, ST25 and ST27 respectively of the flowchart shown in FIG. 26.

First of all, at a stage where a navigation system with the vehicle-route computing apparatus of the 4th embodiment mounted thereon is activated in the vehicle either at a request made by the driver or when predetermined conditions are satisfied, data of a road map of level 2 is all loaded from the road-map storing memory unit 4 into the working memory area 6.

When a departure position (that is, the present position) is established at the step ST22 of the flowchart shown in FIG. 26, data of a road map of level 0 for the vicinity of the departure position is loaded from the road-map storing memory unit 4 into the working memory area 6 at a step ST231 of the flowchart shown in FIG. 27. The flow then continues to a step ST232 to load route data of a departure-area route network of a small departure area from the departure-area route network data storing memory unit 5 into the working memory area 6. The flow then continues to a step ST233 to load data of a road map of level 1 for the vicinity of the departure position from the road-map storing memory unit 4 into the working memory area 6. In conjunction with the route data loaded at the step ST232, the data of a road map of level 1 loaded at the step ST233 serves as a departure-area route network of a small departure area. The flow then proceeds to a step ST234 to load route data of a departure-area route network of a large departure area from the departure-area route network data storing memory unit 5 into the working memory area 6. In conjunction with the data of a road map of level 2 loaded at the navigation-system activating stage, the route data loaded at the step ST234 serves as a departure-area route network of a large departure area. The flow then continues to a step ST235 to search the road map of level 0 of the vicinity of the departure position for up to N1d routes from the departure position which routes are connected to nodes of level 1 in the vicinity of the departure position.

The flow then proceeds to the step ST24 of the flowchart shown in FIG. 26. When a destination position is set at the step ST24, data of a road map of level 0 for the vicinity of the destination position is loaded from the road-map storing memory unit 4 into the working memory area 6 at a step ST251 of the flowchart shown in FIG. 28. The flow then continues to a step ST252 to search the road map of level 0 of the vicinity of the destination position from the destination position in a direction opposite to the traveling direction of the vehicle for up to N1d routes which are connected to nodes of level 1 in the vicinity of the destination position. The flow then continues to a step ST253 to load data of a road map of level 1 of the vicinity of the destination position from the road-map storing memory unit 4 into the working memory area 6. The flow then continues to a step ST254 to load route data of the destination-area route network of the small destination area in order to obtain the destination-area route network of the small destination area.

The flow then proceeds to the step ST26 of the flowchart shown in FIG. 26. When the driver requests that the route finding be started at this step, first of all, at a step ST271 of the flowchart shown in FIG. 29, the road map of level 1 of the vicinity of the destination position is searched in a direction opposite to the traveling direction of the vehicle from up to N1d nodes identified at the step ST252 in the road map of level 1 in the vicinity of the destination position for up to N2 routes which are connected to nodes of level 2 in the departure-area route network of the large departure area. The flow then continues to a step ST272. At this step, roads of level 2 in the departure-area route network of the large departure area and roads of level 1 in the departure-area route network of the small departure area in the vicinity of the departure position are searched for optimum routes connecting up to N2 nodes of level 2 identified at the step ST272 to up to N1d nodes of level 1 identified at the step ST235 in the vicinity of the departure position in a direction opposite to the traveling direction of the vehicle.

Since routes on overlapped hierarchical area route networks resemble a tree, the search can be carried out with ease. The flow then continues to a step ST273 to select, from the nodes of level 1 in the vicinity of the departure position, a node that minimizes the sum of the cost of the search from the departure position and the cost of the search to the destination position. The flow then continues to a step ST274 to extract a route from the departure position to the node selected at the step ST273 and a route from the selected node to the destination position. By concatenating these two routes, an optimum route from the departure position to the destination position can be obtained.

As described above, at a step ST27 of the flowchart shown in FIG. 26, the 4th embodiment carries forward the search for optimum routes in a direction opposite to the traveling direction of the vehicle, that is, from the destination position to the departure position. It should be noted that, instead of the search in the opposite direction, the search can also be carried forward in the traveling direction of the vehicle, that is, from the departure position to the destination position. In this case, the operation begins with the search of roads in the vicinity of the departure position to be continued with the search of the destination-area route network for the destination position before ending the search of roads in the vicinity of the destination position. Since the departure-area route network has already been loaded in the working memory area 6, by using this departure-area route network, the search of roads in the vicinity of the departure area for an optimum route reaching the destination-area route network can be carried out with ease, allowing the search of roads in the vicinity of the departure area to be completed in a short time.

It should be noted that the search for optimum routes can also be carried out as follows. First of all, a relay position on the large-area route networks of the departure and destination positions are found between the departure and destination positions. Then, starting from the relay position, the search of the large-area route network and the small-area route networks for optimum routes is carried forward sequentially toward the departure and destination positions in the centripetal directions. Similarly, by taking advantage of the tree-resemblance property of routes, the search for optimum routes can be accomplished at a high speed.

Embodiment 5

FIG. 30 is an explanatory view used for explaining a technique of searching for optimum routes by utilizing data of both the departure-area route network and the destination-area route network which technique is adopted in a vehicle-route computing apparatus implemented by a 5th embodiment of the present invention.

In the departure-area route network and the destination-area route network, routes in the vicinity of departure and destination areas look like meshes of a net. The computation of substitute routes in the vicinity of departure and destination areas increases a link cost on 1st routes. Substitute routes can thus be found by lowering the priority and changing the link-cost equation. In the case of a long distance such as the distance from the city of Tokyo to the city of Osaka, however, even though the obtained area route network has a tree-like shape, allowing routes to be found in a short time, the degree of freedom to select a route is lowered. As a result, it is difficult to find routes which can serve as mutual substitutes for each other as is the case with the Tomei and Chuo expressways.

In the vehicle-route computing apparatus implemented by the 5th embodiment, recommended routes are found by means of a technique which allows substitute routes to be identified with ease.

First of all, a 1st route computed to pass through a position E is found by utilizing both the departure-area route network and the destination-area route network as shown in FIG. 30. As shown in the figure, the position E is a 1st position at which the destination- area route network coincides with the departure-area route network. Similarly, routes from a 2nd route computed to pass through a position F, the 2nd position of coincidence, to an Nth route computed to pass through the Nth position of coincidence are found. In this way, a plurality of routes are found for a pair of departure and destination positions.

In addition, if large-area route networks for relatively large areas are used as the departure-area route networks and the destination-area route networks in this case as shown in the figure, the probability that routes, which include the 1st and Nth routes not overlapping each other, at all can be computed increases, allowing the routes to keep up with a variety of needs demanded by the driver. Further, if a number of drivers utilize such vehicle-route computing apparatuses, an effect of dispersing the flow of traffic can also be expected as well.

As another technique of finding a substitute route, a plurality of departure-area route networks and destination-area route networks, which are created under several kinds of conditions such as treating tolled roads and ferries as 1st-priority routes, are provided as optional networks to be searched. In this case, such networks are used as substitutes for the ordinary networks.

As another alternative, for some search options, a logical sum of area route networks created under such conditions is computed. The resulting area route network, that is, the calculated logical sum, is then searched in an optional search operation carried out on-line by the onboard navigation system by changing the link cost in accordance with the search option or increasing the link cost of a position to be detoured.

In this case, the shape of the resulting area route network approaches meshes of a net, decreasing the tree resemblance thereof. As a result, the search for an optimum route takes a longer time but, on the contrary, the search for an optimum route has a higher degree of freedom.

As another alternative, a passed-through position on a substitute route being searched for between the departure and destination positions is manually set or automatically set by using a knowledge data base or the like. Then, to begin with, a 1st route is found with the passed-through position taken as a destination. Subsequently, a 2nd route to the destination position is found by treating the passed-through position as a departure position. Finally, a substitute route can then be found by concatenating the 1st and 2nd routes.

As a still further alternative, an area route network is created and a portion to be found as a substitute route is connected manually to form a net.

In the vehicle-route computing apparatuses implemented by the 1st to 5th embodiments described above, when a departure position (or a destination position) is set, the area route network in all directions for the departure position (or the destination position) is loaded. It should be noted that the area route network can be divided into sub-networks different from direction to direction in accordance with destination positions (or departure positions). In this case, only an area route sub-network associated with the set departure position (or the destination position) is loaded, reducing the amount of data being loaded.

As has been described so far in detail, in a vehicle-route computing apparatus provided by the present invention, routes from a departure area to a plurality of destination areas are computed as data of a departure-area route network in advance and data of a plurality of departure-area route networks computed for all departure areas is stored in a memory device. At running time, only data of a departure-area route network associated with the departure position of the vehicle is loaded into a working memory area and the data of the departure-area route network is then searched for recommended guidance routes from the departure position to a destination position. Thus, the required size of the working memory area can be reduced and an excessive search for optimum routes is not required. As a result, the vehicle-route computing apparatus provided by the present invention offers a merit that only roads having a tree-like shape need to be searched, allowing the optimum routes to be found in a short time. In addition, the recommended routes from the present position of the vehicle to the destination position can be found and presented to the driver immediately.

Further, in another vehicle-route computing apparatus provided by the present invention, routes from a plurality of departure areas to a destination area are computed as data of a destination-area route network in advance and data of a plurality of destination-area route networks computed for all destination areas is stored in a memory device. At running time, only data of a destination-area route network associated with the destination position of the vehicle is loaded into a working memory area and the data of the destination-area route network is then searched for recommended guidance routes from a departure position to the destination position. Thus, the required size of the working memory area can be reduced and an excessive search for optimum routes is not required. As a result, the vehicle-route computing apparatus provided by the present invention offers a merit that only roads having a tree-like shape need to be searched, allowing the optimum routes to be found in a short time.

In addition, even if the vehicle misses the guidance routes, a departure area can be set anew with ease during the course of route searching. It is thus not necessary to reload the data of the departure-area route network. For this reason, the vehicle-route computing apparatus provided by the present invention offers a merit that the operation to repeat the search for optimum routes can be carried out at once and the optimum routes can then be provided to the driver immediately.

Further, in a still further vehicle-route computing apparatus provided by the present invention, both data of departure-area route networks and data of destination-area route networks are stored in a memory device in advance. At running time, only data of a departure-area route network and a destination-area route network associated respectively with the departure position and the destination position of the vehicle are loaded into a working memory area and the data of the departure-area route network and the destination-area route network are then searched for recommended guidance routes from the departure position to the destination position. Thus, roads having a tree-like shape can be traced for both the departure and destination positions. As a result, the vehicle-route computing apparatus provided by the present invention offers merits that optimum routes can be found in a short time and, in addition, the recommended routes from the present position of the vehicle to the destination position can be found and presented to the driver immediately.

What is claimed is:

1. A vehicle-route computing apparatus comprising:

a road-map storing means for storing data of road maps for guiding a vehicle;

a departure-area determining means for determining a departure area of said vehicle;

a departure-area route network storing means for storing a plurality of departure-area route network data sets which are each associated with a departure area and obtained by calculating routes from said departure area to a plurality of destination areas in advance; and a route-search processing means for reading out one of said departure-area route network data sets associated with said departure area determined by said departure-area determining means from said departure-area route network storing means, searching said read-out departure-area route network data set for a guidance route from a departure position of said vehicle in said departure area to a destination position toward which said vehicle is heading and presenting said guidance route.

2. A vehicle-route computing apparatus according to claim 1 wherein:

said departure-area route network data sets stored in said departure-area route network storing means are data of departure areas each classified into departure sub-areas at a plurality of hierarchical levels each assigned a predetermined area size whereby, for a small departure sub-area having a small area size at a low hierarchical level, data of routes from said small departure sub-area to a destination area in close proximity to said small departure sub-area is stored and, for a large departure sub-area having a large area size at a high hierarchical level, data of routes from said large departure sub-area to a destination area far way from said large sub-area is stored; and said route-search processing means superimposes a S plurality of said departure-area route network data sets of said small and large departure sub-areas stored in said departure-area route network storing means in order to provide guidance routes from a small departure sub-area to a plurality of remote destination areas.

3. A vehicle-route computing apparatus according to claim 1 wherein data of road maps stored in said road-map storing means comprises data of road maps at a low hierarchical level each comprehensively depicting detailed roads used as a guidance for said vehicle, and data of road maps at a high hierarchical level each created in advance through the steps of:

finding inter-area main routes each connecting a departure area to a destination area using road maps thereof at a low hierarchical level for different combinations of departure and destination areas; and computing a logical sum of a plurality of said inter-area main routes found for said different combinations of departure and destination areas.

4. A vehicle-route computing apparatus according to claim 1 wherein said departure-area route network data sets stored in said departure-area route network storing means each have a tree-like shape obtained by calculating a logical sum of a plurality of routes from a departure area to a plurality of destination areas in advance.

5. A vehicle-route computing apparatus according to claim 1 wherein said data of road maps stored in said road-map storing means is attribute data of branch points and links said links including road segments between said branch points, on each of said road maps and said departure-area route network data sets stored in said departure-area route network storing means each comprise numbers appended to said branch points or said road segments and flags indicating whether or not said branch points or said road segments are usable.

6. A vehicle-route computing apparatus according to claim 1 wherein routes represented in each of said departure-area route network data sets stored in said departure-area route network storing means are found in advance through the steps of:

determining a destination area for destination positions;

finding roads passing through all boundary points of said destination area; and providing a trimmed-road zone enclosing the environs of said destination area.

7. A vehicle-route computing apparatus comprising:
- a road-map storing means for storing road maps for guiding a vehicle;
- a destination-area determining means for determining a destination area from a destination position toward which said vehicle is driven;
- a destination-area route network storing means for storing a plurality of destination-area route network data sets which are each associated with a destination area and obtained by calculating routes from a plurality of departure areas to said destination area in advance; and
- a route-search processing means for reading out one of said destination-area route network data sets associated with said destination area determined by said destination-area determining means from said destination-area route network storing means, searching said read-out destination-area route network data set for a guidance route from a departure position to said destination position of said vehicle in said destination area to which said vehicle is running and presenting said guidance route.

8. A vehicle-route computing apparatus according to claim 7 wherein:
- said destination-area route network data sets stored in said destination-area route network storing means are data of destination areas each classified into destination sub-areas at a plurality of hierarchical levels each having a predetermined area size whereby, for a small destination sub-area having a small area size at a low hierarchical level, data of routes from said small destination sub-area to a departure area in close proximity to said small destination sub-area is stored and, for a large destination sub-area having a large area size at a high hierarchical level, data of routes from said large destination sub-area to a departure area far away from said large destination sub-area is stored; and
- said route-search processing means superimposes a plurality of said destination-area route network data sets of said small and large destination sub-areas stored in said destination-area route network storing means in order to provide guidance routes from a small destination sub-area to a plurality of remote departure areas.

9. A vehicle-route computing apparatus according to claim 7 wherein data of road maps stored in said road-map storing means comprises data of road maps at a low hierarchical level each comprehensively depicting detailed roads used as a guidance for said vehicle, and data of road maps at a high hierarchical level each created in advance through the steps of:
- finding inter-area main routes each connecting a departure area to a destination area using road maps thereof at a low hierarchical level for different combinations of departure and destination areas; and
- computing a logical sum of a plurality of said inter-area main routes found for said different combinations of departure and destination areas.

10. A vehicle-route computing apparatus according to claim 7 wherein said destination-area route network data sets stored in said destination-area route network storing means each have a tree-like shape obtained by calculating a logical sum of a plurality of routes from a destination area to a plurality of departure areas in advance.

11. A vehicle-route computing apparatus according to claim 7 wherein said data of road maps stored in said road-map storing means is attribute data of branch points and links on each of said road maps and said destination-area route network data sets stored in said destination-area route network storing means each comprise numbers appended to said branch points or said road segments and flags indicating whether or not said branch points or said road segments are usable.

12. A vehicle-route computing apparatus according to claim 7 wherein routes represented in each of said destination-area route network data sets stored in said destination-area route network storing means are found in advance through the steps of:
- determining a departure area for departure positions;
- finding roads passing through all boundary points of said departure area; and
- providing a trimmed-road zone enclosing the environs of said departure area.

13. A vehicle-route computing apparatus comprising:
- a road-map storing means for storing road maps for guiding a vehicle;
- a departure-area determining means for determining a departure area of said vehicle;
- a destination-area determining means for determining a destination area from a destination position toward which said vehicle is driven;
- a departure-area route network storing means for storing a plurality of departure-area route network data sets which are each associated with a departure area and obtained by calculating routes from said departure area to a plurality of destination areas in advance; and
- a destination-area route network storing means for storing a plurality of destination-area route network data sets which are each associated with a destination area and obtained by calculating routes from a plurality of departure areas to said destination area in advance;
- a route-search processing means for reading out one of said departure-area route network data sets associated with said departure area determined by said departure-area determining means from said departure-area route network storing means and one of said destination-area route network data sets associated with said destination area determined by said destination-area determining means from said destination-area route network storing means, searching said read-out departure-area route network data set and said read-out destination-area route network data set for a guidance route from a departure position of said vehicle in said departure area to said destination position of said vehicle in said destination area to which said vehicle is running and presenting said guidance route.

14. A vehicle-route computing apparatus according to claim 13 wherein:
- said departure-area route network data sets stored in said departure-area route network storing means are data of departure areas each classified into departure sub-areas at a plurality of hierarchical levels each having a predetermined area size whereby, for a small departure sub-area having a small area size at a low hierarchical level, data of routes from said small departure sub-area to a destination area in close proximity to said small departure sub-area is stored and, for a large departure sub-area having a large area size at a high hierarchical level, data of routes from said large departure sub-area to a destination area far away from said large departure sub-area is stored; and
- said route-search processing means superimposes a plurality of said departure-area route network data sets of said small and large departure sub-areas stored in said departure-area route network storing means in order to provide guidance routes from a small departure sub-area to a plurality of remote destination areas.

15. A vehicle-route computing apparatus according to claim 13 wherein:

said destination-area route network data sets stored in said destination-area route network storing means are data of destination areas each classified into destination sub-areas at a plurality of hierarchical levels each having a predetermined area size whereby, for a small destination sub-area having a small area size at a low hierarchical level, data of routes from said small destination sub-area to a departure area in close proximity to said small destination sub-area is stored and, for a large destination sub-area having a large area size at a high hierarchical level, data of routes from said large destination sub-area to a departure area far away from said large destination sub-area is stored; and said route-search processing means superimposes a plurality of said destination-area route network data sets of said small and large destination sub-areas stored in said destination-area route network storing means in order to provide guidance routes from a small destination sub-area to a plurality of remote departure areas.

16. A vehicle-route computing apparatus according to claim 13 wherein data of road maps stored in said road-map storing means comprises data of road maps at a low hierarchical level each comprehensively depicting detailed roads used as a guidance for said vehicle, and data of road maps at a high hierarchical level each created in advance through the steps of:

finding inter-area main routes each connecting a departure area to a destination area using road maps thereof at a low hierarchical level for different combinations of departure and destination areas; and computing a logical sum of a plurality of said inter-area main routes found for said different combinations of departure and destination areas.

17. A vehicle-route computing apparatus according to claim 13 wherein said departure-area route network data sets stored in said departure-area route network storing means each have a tree-like shape obtained by calculating a logical sum of a plurality of routes from a departure area to a plurality of destination areas in advance.

18. A vehicle-route computing apparatus according to claim 13 wherein said destination-area route network data sets stored in said destination-area route network storing means each have a tree-like shape obtained by calculating a logical sum of a plurality of routes from a destination area to a plurality of departure areas in advance.

19. A vehicle-route computing apparatus according to claim 13 wherein:

said data of road maps stored in said road-map storing means is attribute data of branch points and links said links including road segments between said branch points, on each of said road maps;

said departure-area route network data sets stored in said departure-area route network storing means each comprise numbers appended to said branch points or said road segments and flags indicating whether or not said branch points or said road segments are usable; and said destination-area route network data sets stored in said destination-area route network storing means each comprise numbers appended to said branch points or said road segments and flags indicating whether or not said branch points or said road segments are usable.

* * * * *